(12) United States Patent
Courter

(10) Patent No.: US 9,527,609 B2
(45) Date of Patent: Dec. 27, 2016

(54) VEHICLE ABLATOR SYSTEM

(71) Applicant: The Boeing Company, Seal Beach, CA (US)

(72) Inventor: Kelly Jonathan Courter, Tustin, CA (US)

(73) Assignee: THE BOEING COMPANY, Chicago, IL (US)

( * ) Notice: Subject to any disclaimer, the term of this patent is extended or adjusted under 35 U.S.C. 154(b) by 25 days.

(21) Appl. No.: 14/252,159

(22) Filed: Apr. 14, 2014

(65) Prior Publication Data

US 2015/0291292 A1    Oct. 15, 2015

(51) Int. Cl.
*B64G 1/52* (2006.01)
*B64G 1/62* (2006.01)
*B64G 1/58* (2006.01)

(52) U.S. Cl.
CPC .. *B64G 1/62* (2013.01); *B64G 1/58* (2013.01)

(58) Field of Classification Search
CPC ............... B64G 1/58; B64G 1/62; B64G 1/52; B64G 1/22; B64G 1/226; B64G 1/12; B64G 2001/52
See application file for complete search history.

(56) References Cited

U.S. PATENT DOCUMENTS

| | | | | |
|---|---|---|---|---|
| 3,321,154 | A * | 5/1967 | Downs | 244/159.1 |
| 6,627,697 | B2 | 9/2003 | Barney et al. | |
| 7,919,167 | B1 * | 4/2011 | Rawal | B64G 1/58 427/181 |
| 8,714,491 | B2 * | 5/2014 | Simon et al. | 244/159.1 |
| 2009/0084902 | A1 * | 4/2009 | Simon et al. | 244/171.7 |

OTHER PUBLICATIONS

AVCOAT 5026-39; NASA code for specific ablative heat shield material created by Avco/Textron; http://www.textrondefense.com/products/protection-systems/thermal-material-systems.

* cited by examiner

*Primary Examiner* — Philip J Bonzell
(74) *Attorney, Agent, or Firm* — Francisco A. Rubio-Campos; Apogee Law Group P.C.

(57) ABSTRACT

A vehicle ablator system ("VAS") is described that includes a reinforcing core and ablative material that has been packed and cured into the reinforcing core. In general, the VAS includes the reinforcing core that is attached to a vehicle structure such as, for example, a reentry vehicle or hypersonic vehicle prior to the ablative material being packed into the reinforcing core.

17 Claims, 25 Drawing Sheets

Reinforcing Core 1000

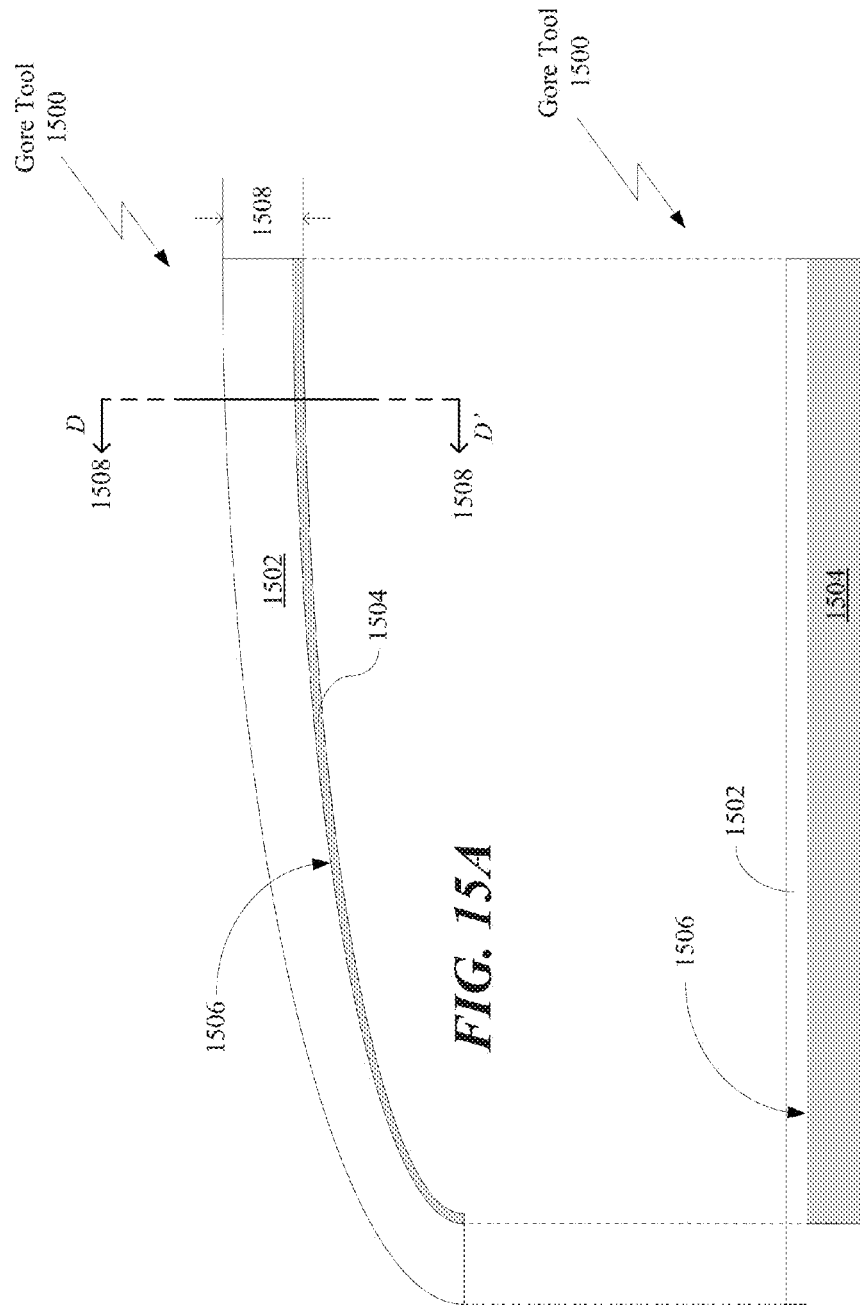

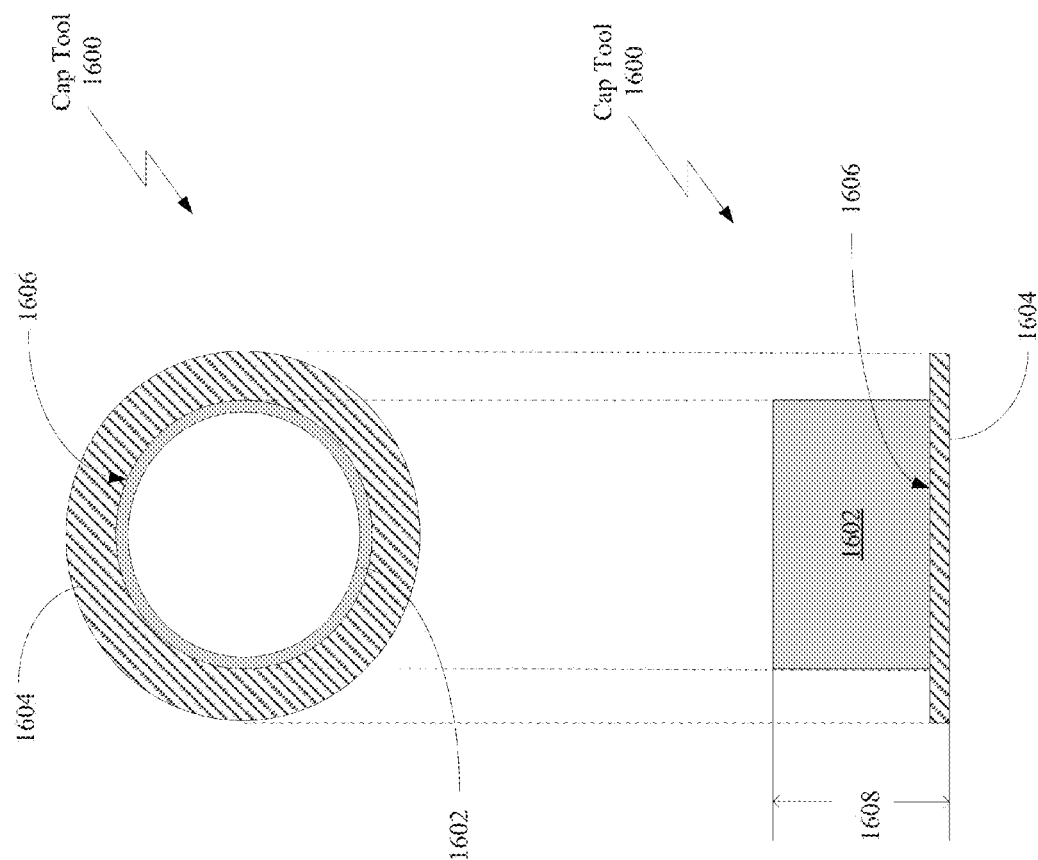

VEHICLE ABLATOR SYSTEM

TECHNICAL FIELD

The present invention relates generally to ablator compositions and more particularly to process for securing an ablative material to a structure.

BACKGROUND

An important challenge faced by thermal protection system ("TPS") designers is to provide reliable thermal protection for the crew or payload inside, within a limited fraction of the available vehicle mass. Generally, the design, manufacture, and implementation of the TPS are usually at the top of a reentry vehicle development risk list. This is especially the case when human occupants are involved with the reentry vehicle because the TPS is a sub-system that usually has no redundancy and a reentry vehicle is subjected to very high temperatures during atmospheric reentry. Specifically, the windward surface of a reentry vehicle is typically exposed to extreme temperatures and may be protected with ablative materials. In FIG. 1, a bottom perspective view of an example of an implementation of an atmospheric reentry vehicle 100 is shown. The atmospheric reentry vehicle 100 may include a vehicle structure 102 and a TPS shown as a heat shield 104 attached to the bottom of the vehicle structure 102. The heat shield 104 may be a separate structure that is attached to the bottom surface 200 of the vehicle structure 102 as shown in the exploded side view of FIG. 2.

The structure of a large reentry vehicle (or a hypersonic vehicle) is inherently flexible due to the imposed aero loads and other stresses. Unfortunately, this leads to a problem because existing ablator materials are stiff and have low strain to failure characteristics, resulting in cracking through-the-thickness of the ablator material during deflection.

Attempts at solving this problem have included utilizing structurally supporting scaffolds (i.e., a reinforcing core such as, for example, a honeycomb structure) to form an ablator having a reinforcing core (herein referred to as an "ARC"). An example of a core-reinforcement 300 is shown in FIGS. 3A and 3B.

In FIG. 3A, a partial top view of an example of an implementation of a core-reinforcement 300 is shown that may be utilized in the heat shield shown in FIGS. 1 and 2. In this example, the core-reinforcement 300 may include a plurality of cells 302 within the honeycomb structure of the core-reinforcement 300. In FIG. 3B, a partial side view of the core-reinforcement 300 is shown along a cutting plane A-A' 304 looking into the side of the core-reinforcement 300. In this example, the height 306 of core-reinforcement 300 may be a few inches high, such as, for example, 2 to 4 inches in height 306. In this example, the cells 302 of the core-reinforcement 300 are filled with ablative material (not shown) and cured to form the ARC.

Generally, a method for making an ARC includes injecting (also referred to as "gunning") the reinforcing core (such as a honeycomb structure) with an ablative material (such as, for example, the material described in United States ("U.S.") U.S. Pat. No. 6,627,697, which is incorporated by reference herein in its entirety) to form the ARC. The ARC is then cured in an autoclave. The cured ARC may then be secured to the reentry vehicle to form an ARC-protected structure. This process prohibits bond verification, because of the large loads involved (i.e., the size and weight of the ARC) in this method would typically damage and/or destroy the underlying vehicle structure bottom surface 200. Additionally, other problems may include lifting, moving, or tipping a smaller vehicle with the bond verification loads. Generally, the bond verification loads on an adjacent structure may require large ground support equipment and tooling and hard points on the vehicle capable of withstanding the resulting reaction load.

Bond verification is significant because it directly correlates with the structural integrity of the entire TPS. Specifically, the structural integrity of the ARC (and thus the entire reentry vehicle), at least in part, is determined by how well the ARC is secured to the reentry vehicle, or at the very least, adds confidence that the reentry vehicle will retain its structural integrity during and after reentry into Earth's atmosphere. TPS bond verification is particularly critical to the safety of manned reentry vehicles due to the lack of redundancy of the TPS.

Another problem associated with known TPS manufacturing techniques is that they are very labor intensive and time consuming. As an example, the Apollo program of the National Aeronautics and Space Administration's ("NASA") utilized a reinforcing core that consisted of a fiberglass honeycomb matrix that was fabricated by injecting an ablative material into the honeycomb matrix. In the Apollo material, the ablative material was an epoxy novolac resin with special additives and the ARC was known as "Avcoat 5026-39H." Unfortunately, in fabrication, the empty honeycomb cells had to be individually gunned with the ablative material by a human operator using a heated caulk-gun-like tool. Additionally, because the Avcoat 5026-39H has firm putty consistency at room temp, each tube of Avcoat 5026-39H needed to be preheated before it could be pumped from the heated caulk-gun-like tool to fill each honeycomb cell.

As an example, in the Apollo program over 100,000 individual honeycomb cells in the reinforcing core had to be manually gunned and progressively cured. In the case of the Apollo program, the process of fabricating an ARC took about nine months. More recently, the Orion Multi-Purpose Crew Vehicle being built by NASA has a 5 meter in diameter ARC that has approximately 330,000 cells within the fiberglass-phenolic honeycomb matrix of the reinforcing core. Again, as in the Apollo program, each cell of the 330,000 must be manually gunned by a human operator using a caulk-gun-like tool with an ablative material that is again Avcoat 5026-39H material and then the ARC is heated to help cure the ablative material inside the honeycomb cells of the ARC.

As such, there is a need for a vehicle ablator system that addresses the shortcomings discussed above.

SUMMARY

Described is a vehicle ablator system ("VAS") that includes a reinforcing core and ablative material that has been packed and cured into the reinforcing core. In general, the VAS includes the reinforcing core that is attached to a vehicle structure such as, for example, a reentry vehicle or hypersonic vehicle prior to the ablative material being packed into the reinforcing core. The reinforcing core includes a plurality of cavities and the ablative material is packed into the plurality of cavities. Generally the reinforcing core may be a honeycomb structure that is bonded to the vehicle structure by an adhesive or other bonding technique. The reinforcing core may be made of metal, fabric, plastic, ceramic, epoxy, or a combination of these materials.

Generally, the VAS may be fabricated by a process that includes attaching the reinforcing core to the vehicle structure, packing the reinforcing core with the ablative material, and curing the ablative material. This process may be performed in a non-iterative fashion where the reinforcing core is attached to the vehicle structure all at once and then all the ablative material is packed into the entire reinforcing core, and then the entire reinforcing core with packed ablative material is cured in a single step or it may be done iteratively.

If done iteratively, a first portion of the reinforcing core may be first attached to the vehicle structure. Then the first portion of the reinforcing core may be packed with the ablative material and then the ablative material in the first portion of the reinforcing core may be cured. Once cured, a second portion of the reinforcing core may be attached to the vehicle structure. Once attached, the second portion of the reinforcing core may be packed with the ablative material and then the ablative material in the second portion of the reinforcing core may be cured. This process may be continued until all the portions of the reinforcing core are attached to the vehicle structure and packed with ablative material that has been cured.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIGS. 15A through 15C are different views of an example of an implementation of a gore tool in accordance with the present invention.

FIGS. 16A and 16B are different views of an example of an implementation of a cap tool in accordance with the present invention.

DETAILED DESCRIPTION

A vehicle ablator system ("VAS") is described that includes a reinforcing core and ablative material that has been packed and cured into the reinforcing core. In general, the VAS includes the reinforcing core that is attached to a vehicle structure such as, for example, a reentry vehicle or hypersonic vehicle, prior to the ablative material being packed into the reinforcing core. The reinforcing core includes a plurality of cavities and the ablative material is packed into the plurality of cavities. Generally the reinforcing core may be a honeycomb structure that is bonded to the vehicle structure by an adhesive or other bonding technique. The reinforcing core may be made of metal, fabric, plastic, carbon fiber, quartz, Kevlar® (i.e., a para-aramid synthetic fiber), Ultraflex®, fiberglass, ceramic, epoxy, or a combination of these materials.

Generally, the VAS may be fabricated by a process that includes attaching the reinforcing core to the vehicle structure, packing the reinforcing core with the ablative material, and curing the ablative material. This process may be performed in a non-iterative fashion where the reinforcing core is attached to the vehicle structure all at once and then all the ablative material is packed into the entire reinforcing core, and then the entire reinforcing core with the packed ablative material is cured in a single step or it may be done iteratively. In this approach, multiple cavities of the reinforcing core may be filled concurrently with the ablative material via a packing (i.e., filling and stuffing) process instead of individually injecting each cavity with a heated caulk-gun-like tool. Specifically, in this approach, the ablative material may be deposited on top of the reinforcing core in clumps of ablative material that may then be physically packed down into the reinforcing core to fill the cavities of the reinforcing core. This packing process may be performed either manually or in an automated fashion.

If done iteratively, a first portion of the reinforcing core may be first attached to the vehicle structure. Then the first portion of the reinforcing core may be packed with the ablative material and then the ablative material in the first portion of the reinforcing core may be cured. Once cured, a second portion of the reinforcing core may be attached to the vehicle structure. Once attached, the second portion of the reinforcing core may be packed with the ablative material and then the ablative material in the second portion of the reinforcing core may be cured. This process may be continued until all the portions of the reinforcing core are attached to the vehicle structure and packed with ablative material and cured.

Figure 4:
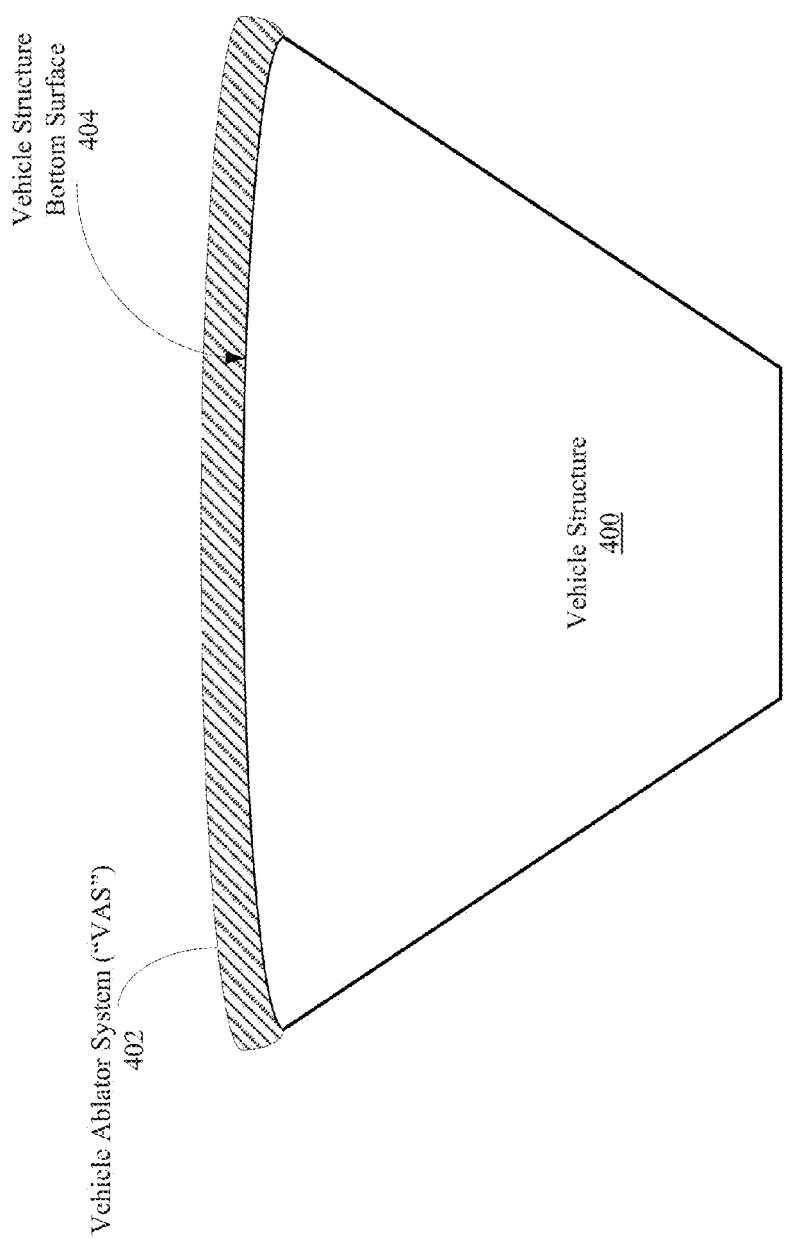
FIG. 4 is a side assembly view of an example of an implementation of a vehicle structure with a vehicle ablator system ("VAS") in accordance with the present invention.

Turning to FIG. 4, a side assembly view of an example of an implementation of a vehicle structure 400 with a VAS 402 is shown in accordance with the present invention. The vehicle structure 400 and VAS 402 may be part of a hypersonic vehicle or an atmospheric reentry vehicle such as, for example, a space capsule. The vehicle structure 400 includes a bottom surface 404 and the VAS 402 is attached to the bottom surface 404 of the vehicle structure 400.

As mentioned earlier, the VAS 402 includes a reinforcing core and ablative material that has been packed and cured into the reinforcing core. In this example, the VAS 402 is fabricated as a "stack-up" process on the bottom surface 404 of the vehicle structure 400, where a reinforcing core with a plurality of cavities (i.e., cells) is attached to the bottom surface 404 of the vehicle structure 400 with the assistance of VAS tooling and then the plurality of cavities are filled with the ablative material. The combined structure is then vacuum bagged for cure and the VAS is then placed in a curing device such as, for example, an autoclave, and the ablative material is cured. This process may be repeated until the entire bottom surface 404 of the vehicle structure 400 is covered with the combined reinforcing core and ablative material for the complete VAS 402.

Figure 5:
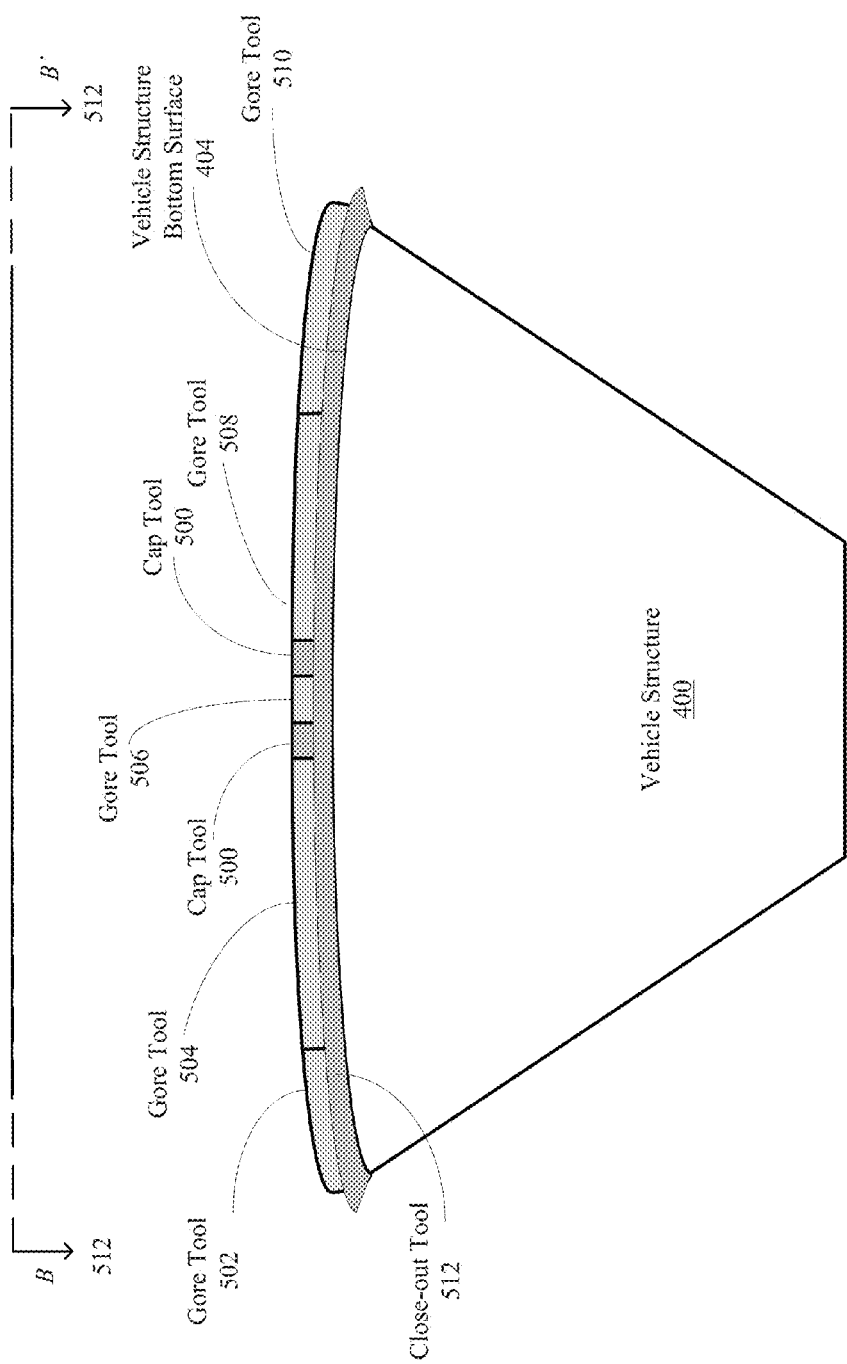
FIG. 5 is a side view of the vehicle structure shown in FIG. 4 having VAS tooling placed on the bottom surface of the vehicle structure.

In FIG. 5, a side view of the vehicle structure 400 is shown having VAS tooling placed on the bottom surface 404 of the vehicle structure 400. The VAS tooling may include a cap tool 500 and gore tooling 502, 504, 506, 508, and 510 and close-out tool 512, where the cap tool 500 allows for the creation, through a stack up, of a center portion of the VAS 402, while the gore tooling 502, 504, 506, 508, and 510 in combination with other gore tooling (not seen in this view) and the close-out tool 512 allows for the creation, through a stack-up, of gores (i.e., triangle or sector portions of the circular area of the bottom surface 404 of the vehicle structure 400) of the VAS 402.

Figure 6:
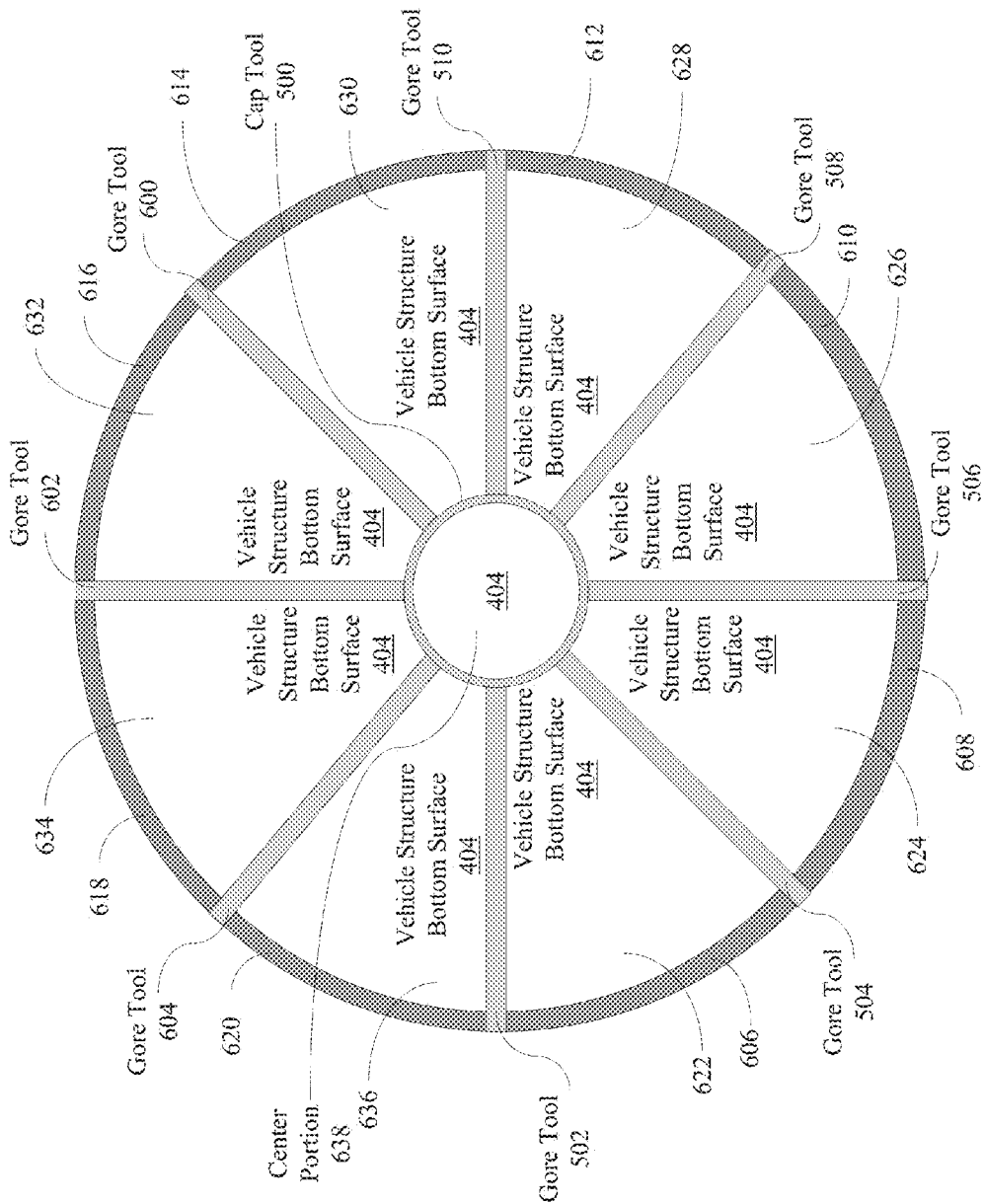
FIG. 6 is a top view of the bottom surface of the vehicle structure, shown in FIGS. 4 and 5, in accordance with the present invention.

Turning to FIG. 6, a top view of the bottom surface 404 of the vehicle structure 400 along a cutting plane B-B' 512 looking into the top of the bottom surface 404 of the vehicle structure 400 is shown with the VAS tooling in place. The VAS tooling may include additional gore tools 600, 602, and 604. The combined close-out tools 512 (shown in FIG. 5) may also be divided into eight individual close-out tools 606, 608, 610, 612, 614, 616, 618, and 620. In this example, the eight gore tools 502, 504, 506, 508, 510, 600, 602, and 604 define eight gores (or sector sections along the bottom surface 404 of the vehicle structure 400) 622, 624, 626, 628, 630, 632, 634, and 636, respectively. Moreover, the VAS tooling may include the cap tool 500 that defines a center portion 638. All of the gores 622, 624, 626, 628, 630, 632, 634, and 636 and center portion 638 will be filled with portions of a reinforcing core and ablative material through a stack-up and curing process.

It is appreciated by those of ordinary skill in the art that while only eight gore tools 502, 504, 506, 508, 510, 600, 602, and 604 are shown defining the eight gores 622, 624, 626, 628, 630, 632, 634, and 636, this numerical choice was made for the purpose of illustration only. The number of gore tools utilized may be arbitrarily chosen by the TPS designer. Additionally, it is also appreciated that of other types of shapes (i.e., a non-sectorial geometric shape) may be utilized for the gores and the cap tool if desired.

In general, an example of the process starts by fitting a portion of the reinforcing core into a gore section and bonding it into the gore section. If the reinforcing core is made of metal it may be bonded by adhesive or other bonding techniques (such as, for example, welding) to the bottom surface 404 of the vehicle structure 400. If the reinforcing core is made of plastic, fiberglass, ceramic, or other similar materials, it may be bonded by adhesive (such as, for example, film adhesive) to the bottom surface 404 of the vehicle structure 400. The reinforcing core may be primed with an adhesion promoter or other similar sub-processes to help properly attach the reinforcing core to the bottom surface 404 of the vehicle structure 400. Additionally, the inner surface (not shown) of the reinforcing core may be slotted (not shown) to allow for any trapped air in the bottom of the cells (i.e., cavities) to escape (i.e., vented) during the filling of the reinforcing core. As an example, each cell may be slotted diagonally through the bottom surface to dimensions of approximately 0.06 inch wide by 0.12 inch deep. There may be a minimum of one slot in each cell of reinforcing core. Once bonded, the portion of the reinforcing core may be submitted to a bonding verification process to test the quality of the bonding. An example bonding verification process may include a local pull test of the portion of the reinforcing core bond, and/or visual inspection of adhesive wetting the core, and/or light leakage from one cell to another.

The local pull test may include, for example: attaching a gripping device to a location of the bonded reinforcing core (such location may be random or predeterminedly selected); attaching a force gauge to the gripping device; and then pulling the combined gripping device and force gauge until a predetermined force reading on the force gauge is reached. The gripping device may be, for example, a Vise-Grip® 6LN pliers that has about 1.4 inches long nose and the force gauge may be, for example, a CHATILLON® LG series mechanical force gauge produced by AMETEK, Inc. of Largo, Fla. The predetermined force reading may be, for example, 20 lbs and the direction of the pulling force may be perpendicular to the structure of the reinforcing core. In this example, the location of the bonded reinforcing core, to which the gripping device will be attached, may be a location where two adjacent cells of the reinforcing core are fused together. The gripping device may include a locking mechanism that may be adjusted so as to not slip under the load testing. The force gauge may then be attached to the gripping device. If the gripping device is a vice grip 6LN pliers, a lanyard loop may be attached to the end of the pliers and to the force gauge.

After the force gauge is pulled to the predetermined force reading (e.g., 20 lbs), the pulling force may be released and the gripping device removed from the reinforcing core. The tested area of the reinforcing core may then be inspected with a light and/or probe to determine if the reinforcing core of the tested area is still bonded to the vehicle structure bottom surface. This process may be repeated numerous times along both free edges of the reinforcing core and within the acreage of the reinforcing core. As an example, this process may be repeated every 4 to 8 inches along both the free edges and within the acreage of the reinforcing core.

Figure 7:
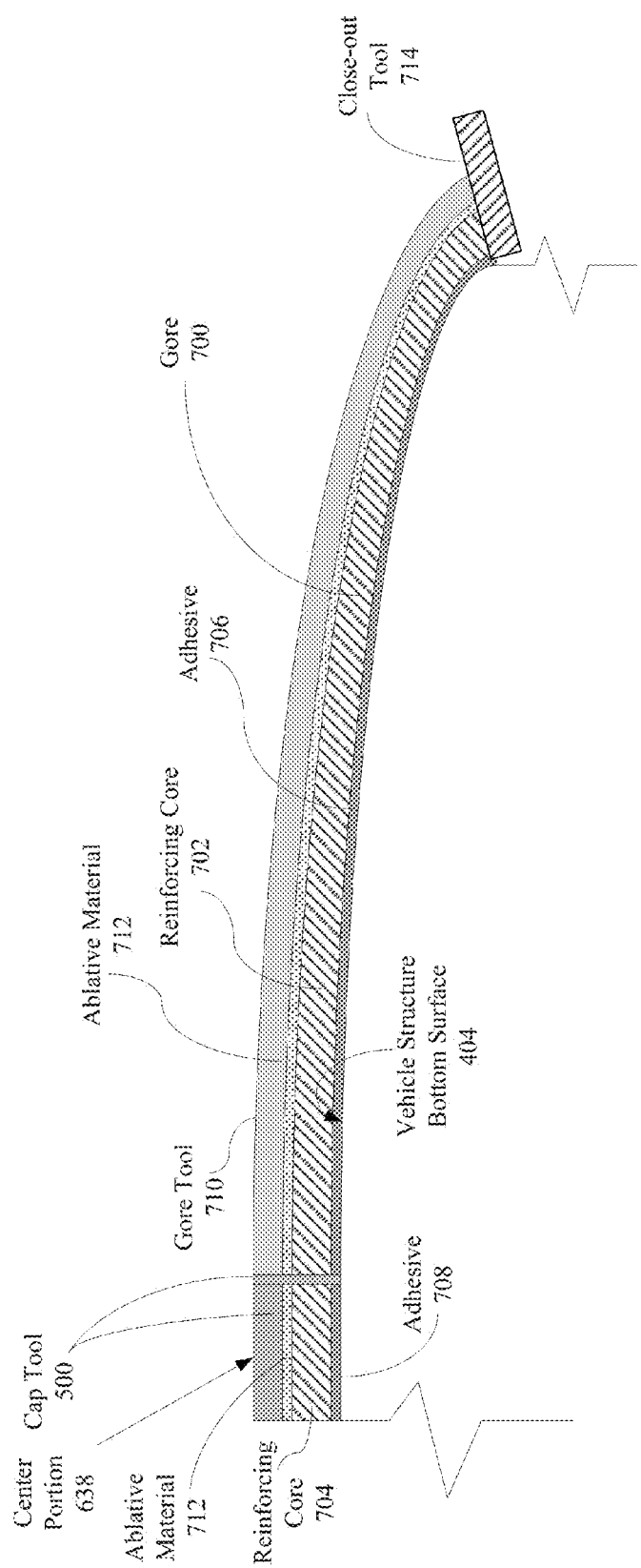
FIG. 7 is a side view of a gore and a portion of the center portion, shown in FIG. 6, in accordance with the present invention.

As an example, in FIG. 7, a side view of a gore 700 and a portion of the center portion 638 are shown in accordance with the present invention. Specifically, a first portion of the reinforcing core 702 is shown attached to the bottom surface 404 of the vehicle structure 400. Additionally, a second portion of the reinforcing core 704 is also shown attached to the bottom surface 404 of the vehicle structure 400 within the cap tool 500. The first and second portions of the reinforcing core 702 and 704 may be attached to the bottom surface 404 of the vehicle structure 400 with a bonding adhesive 706 and 708. In this example, the height of the first and second portions of the reinforcing core 702 and 704 are shown to be below the height (or heights) of the cap tool 500 and gore tool 710. The layer of ablative material 712 is shown to be filling the portions of the reinforcing core 702 and 704 and protruding from the portions of the reinforcing core 702 and 704 to form a layer of ablative material 712 above the portions of the reinforcing core 702 and 704 but below the height (or heights) of the cap tool 500 and gore tool 710. A close-out tool 714 is also shown for holding the ablative material 712 in place within the gore 700. In general, the close-out tool 714 is a circumferential structural component that contains the ablative material 712 within the gore 700.

Figure 1:
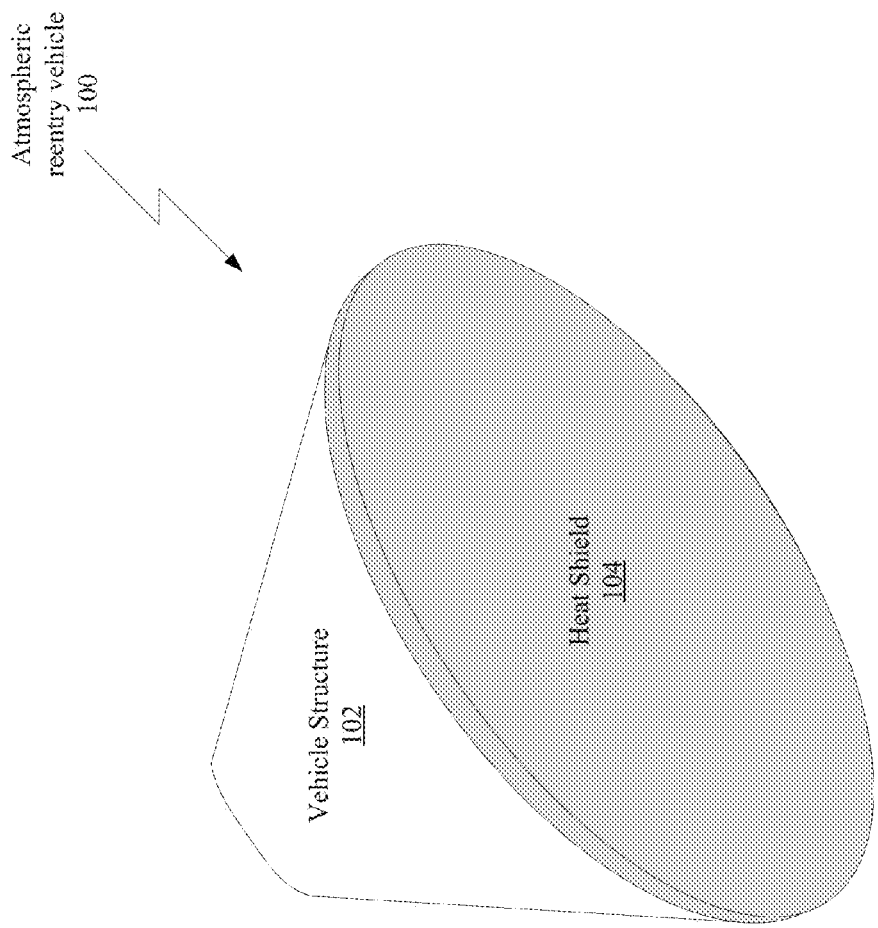
FIG. 1 is a bottom perspective view of an example of an implementation of an atmospheric reentry vehicle.
Figure 2:
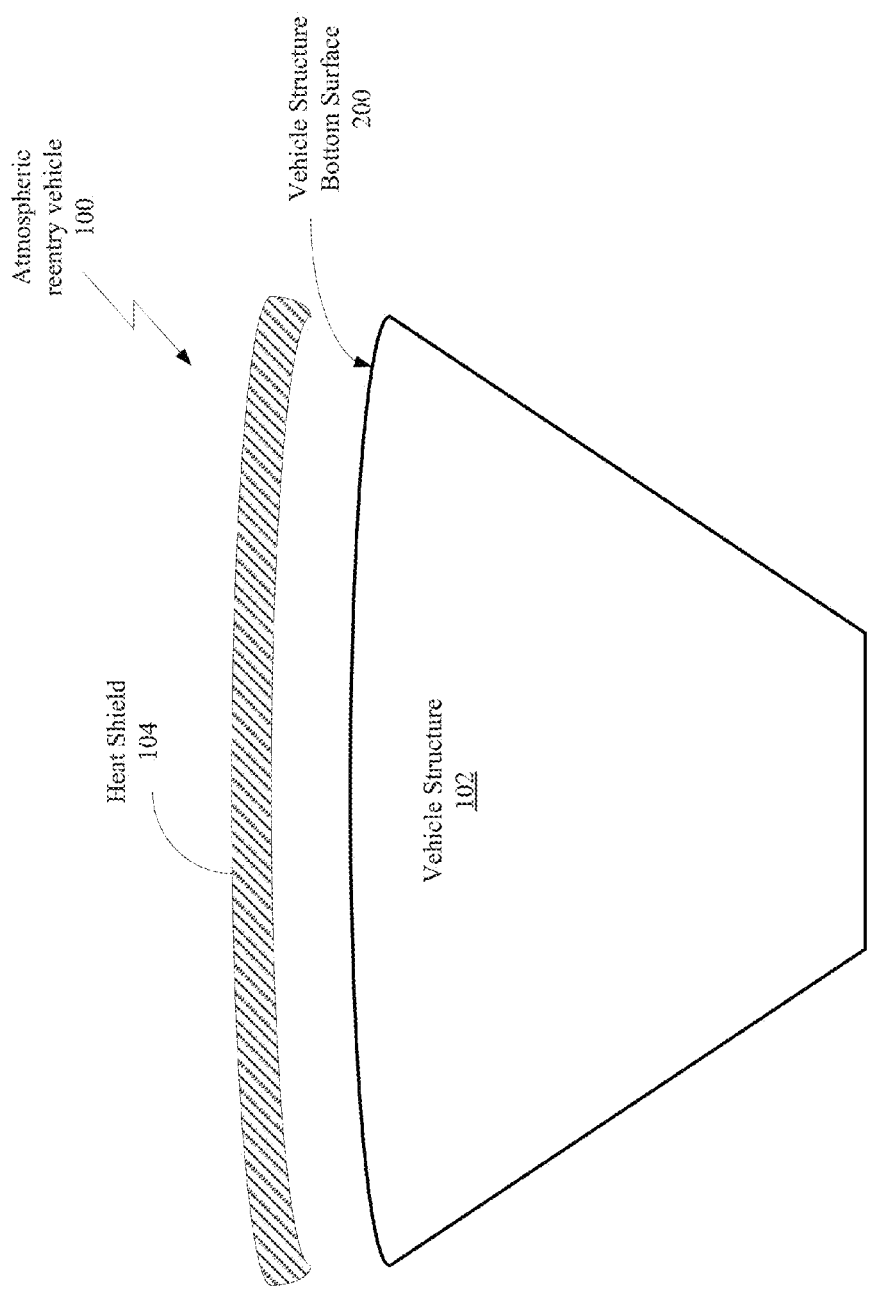
FIG. 2 is an exploded side view of the atmospheric reentry vehicle showing the vehicle structure and heat shield shown in FIG. 1.
Figure 3:
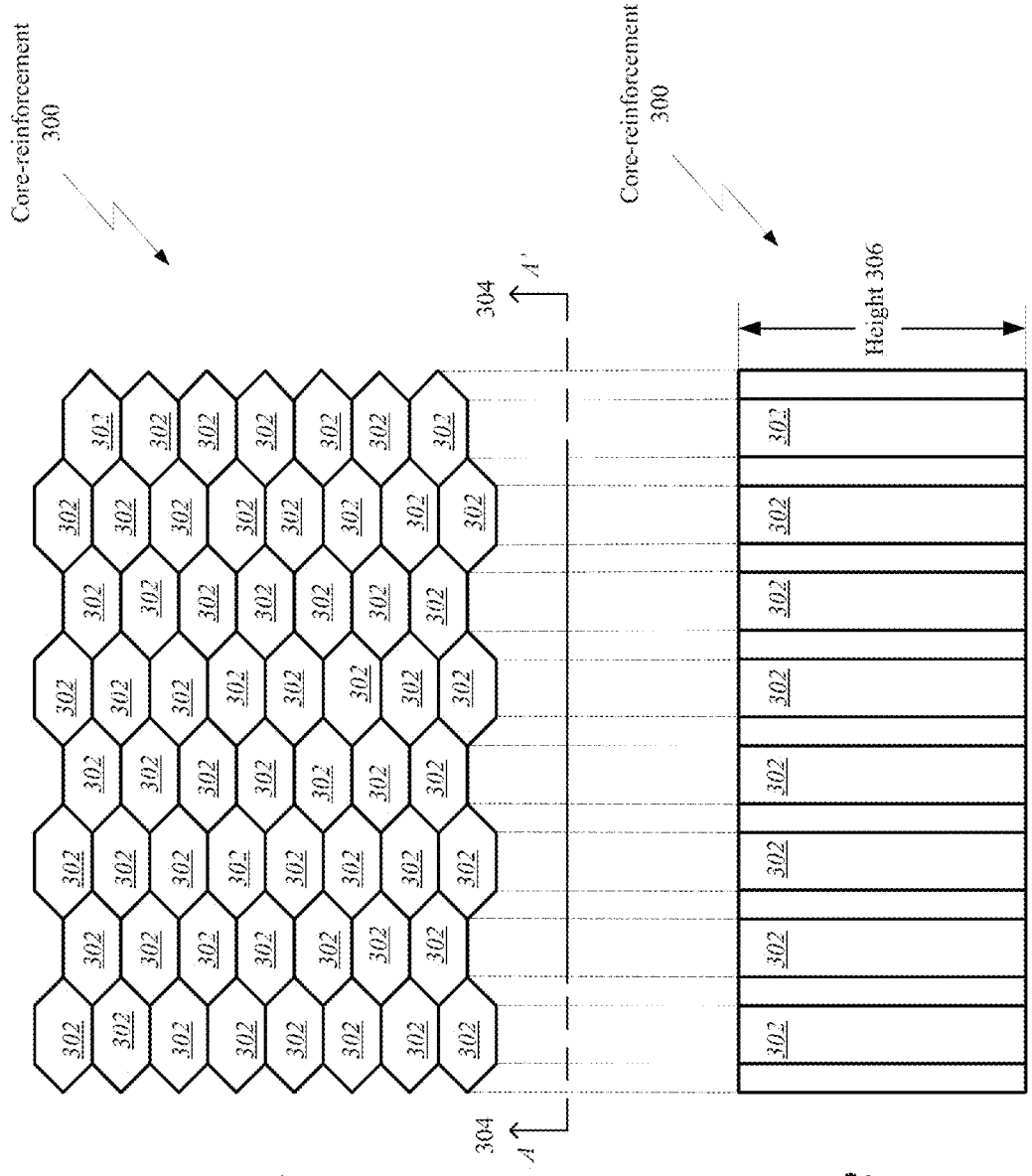
FIG. 3A is a partial top view of an example of an implementation of a core-reinforcement that may be utilized in the heat shield shown in FIGS. 1 and 2.
FIG. 3B is a partial side view of a core-reinforcement shown in FIG. 3A.
Figure 8:
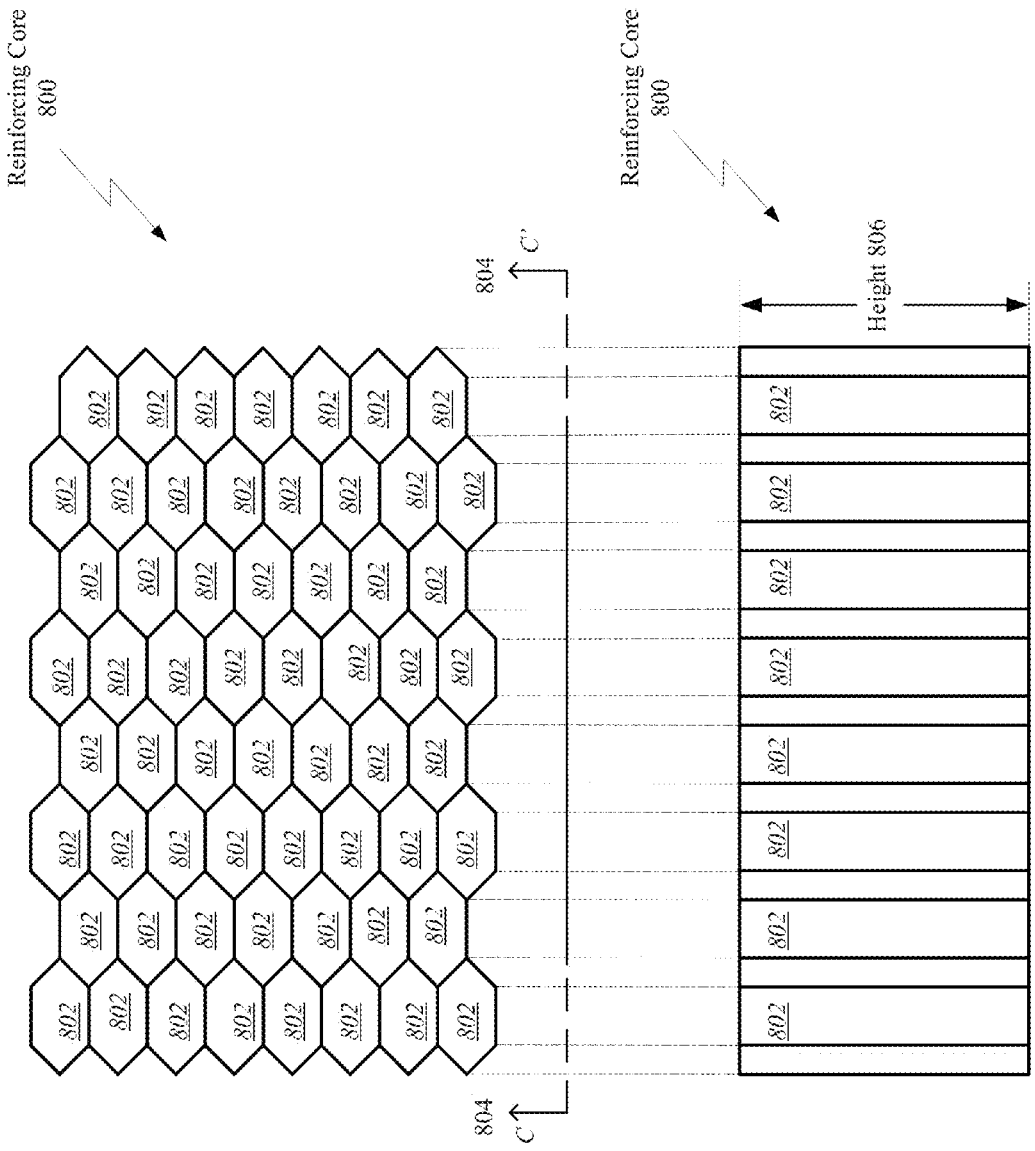
FIG. 8A is a partial top view of an example of an implementation of the reinforcing core that may be utilized in the VAS shown in FIG. 4.
FIG. 8B is a partial side view of the reinforcing core shown in FIG. 8A.

Similar to FIGS. 3A and 3B, in FIGS. 8A and 8B an example of an implementation of a reinforcing core 800 is shown. Specifically in FIG. 8A, a partial top view of an example of an implementation of the reinforcing core 800 is shown that may be utilized in the VAS 402 shown in FIG. 4. In this example, the reinforcing core 800 may include a plurality of cavities 802 (i.e., cells) within the reinforcing core 800, which may be a honeycomb structure. In FIG. 8B, a partial side view of the reinforcing core 800 is shown along a cutting plane C-C' 804 looking into the side of the reinforcing core 800. In this example, the height 806 of reinforcing core 800 may be a few inches high such as, for example, 2 to 4 inches in height 806. In this example, the cavities 802 of the reinforcing core 800 are filled with the ablative material shown in FIG. 7. In this example, the gores may be optionally divided into sub-divided gores and caps with tooling that defines different zones having gaps. This approach allows for controlled local shrinkage of the ablator material after curing at elevated temperatures without cracks. The approach is similar to the utilization of expansion joints in concrete slabs. The gaps may then be filled with a room-temperature curing formulation of the same ablator material.

Figure 9:
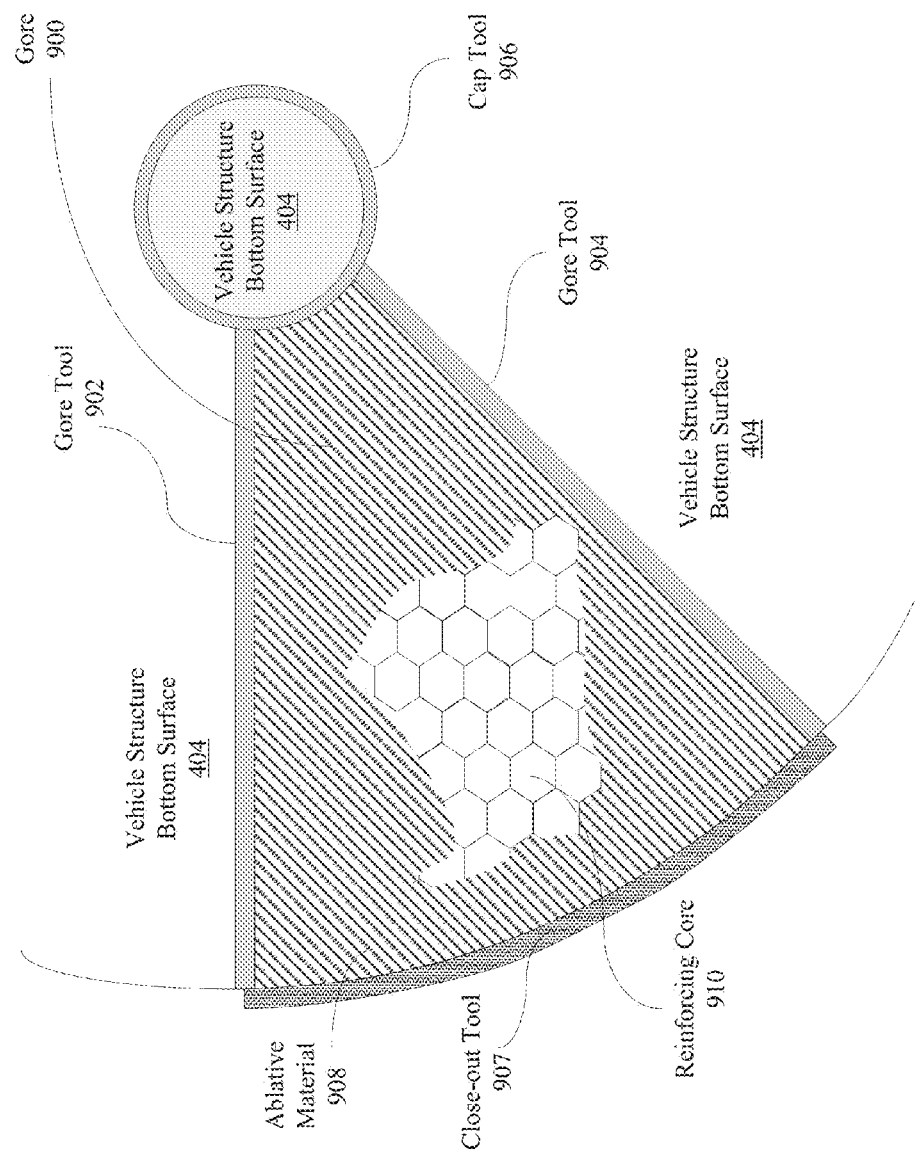
FIG. 9 is a top view of a gore defined by two gore tools and a cap tool and partially filled with ablative material over a portion of the reinforcing core in accordance with the present invention.

In FIG. 9, a top view of a gore 900 defined by two gore tools 902 and 904, cap tool 906, and close-out tool 907 and partially filled with ablative material 908 over a portion of the reinforcing core 910 is shown in accordance with the present invention. In this example, the ablative material 908 may be a low density ablator composition (as described in U.S. Pat. No. 6,627,697), a lightweight ablator formulation that includes two endothermically decomposing materials with a fluxing agent. In this example, unlike the known processes utilized in the Apollo and Orion programs, the ablative material 908 does not need to be manually gunned into each cavity of the partial portion of the reinforcing core 910. If the ablative material 908 is chosen properly, the working life of the ablative material 908 may allow several days to pack the ablative material 908 into several hundred square feet of the portion of the reinforcing core 910 before it has to be cured. In this example, the ablative material 908 may be hand packed on the top of the partial portion of the reinforcing core 910 and physically packed down so as to fill the cavities in the partial portion of the reinforcing core 910.

Figure 10:
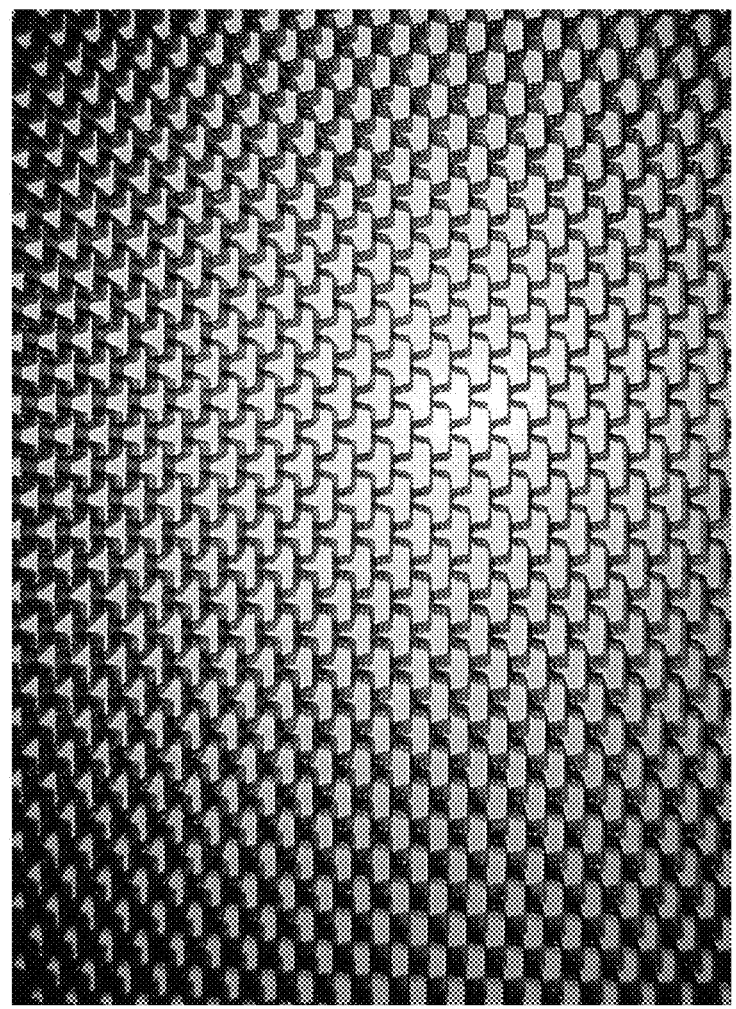
FIG. 10 is a partial top view of an example of another implementation of the reinforcing core that may be utilized in the VAS shown in FIG. 4.

The reinforcing core shown in FIGS. 8A, 8B, and 9 shows a hexagonal core structure for the cavities in the honeycomb structure of the reinforcing core; it is appreciated that this is for illustrative purposes only and that other types of honeycomb structures may also be used. As an example, the reinforcing core may use a non-hexagonal core structure such as, for example, the core structure known as Ultraflex® produced by Ultracor Inc. of Livermore, Calif., which has a distinctive cavity (i.e., cell) geometry for a reinforcing core 1000 is shown in FIG. 10. Using the Ultraflex® core as the reinforcing core 1000 allows the reinforcing core to be utilized on a structure that has unique bends and curvatures that is generally referred to as a complex curvature.

Figure 11:
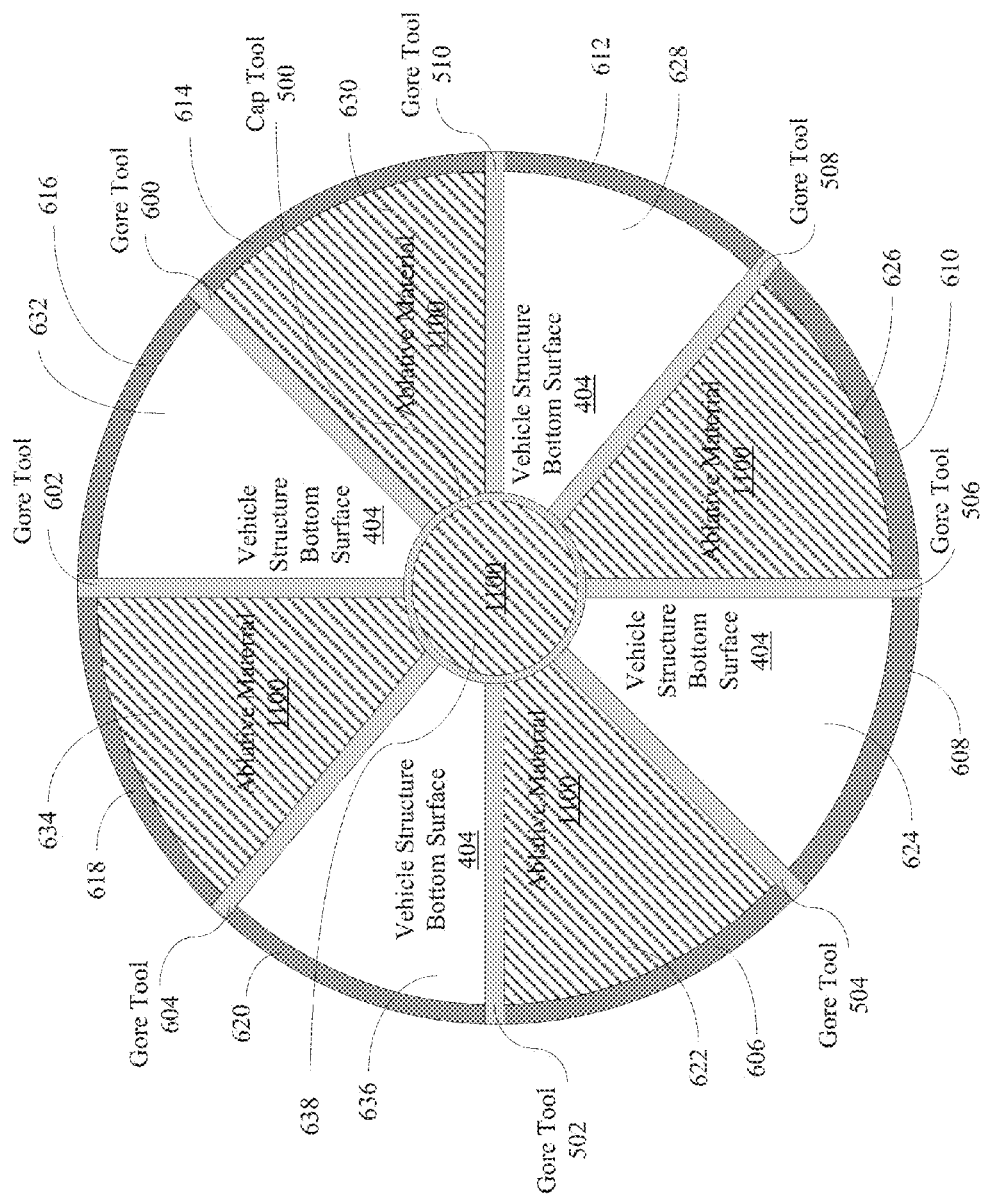
FIG. 11 is a top view of the bottom surface of the vehicle structure of FIG. 6 showing four of the gores and the center portion being filled with a combination of portions of the reinforcing core and a first deposit of ablative material in accordance with the present invention.

Turning to FIG. 11, gores 622, 626, 630, and 634 and center portion 638 may be filled with portions of the reinforcing core and then filled with a first deposit of the ablative material 1100, where the gores 624, 628, 632, and 636 remain as exposed portions of the bottom surface 404 of the vehicle structure 400. In this example, the portions of the reinforcing core lie beneath the first deposit of the ablative material 1100 where the ablative material 1100 is both packed into the cells of the reinforcing core and applied over the ablative filled reinforcing core to produce a layer of ablative material 1100 over the ablative filled reinforcing core. Once the ablative material 1100 is packed into gores 622, 626, 630, and 634 and center portion 638, the entire structure is vacuum bagged for curing. The ablative material 1100 is then cured with a curing device such as, for example, an autoclave (not shown). Once cured, the gore tooling 502, 504, 506, 508, 510, 600, 602, and 604, the close-out tools 606, 610, 614, and 618, and cap tool 500 may be removed leaving only the close-out tools 608, 612, 616, and 620 and the cured portion of the combined reinforcing core and cured ablative material 1200 in gores 622, 626, 630, and 634 and center portion 638, as shown in FIG. 12.

It is noted that the portions of the reinforcing core may be bonded to the bottom surface 404 of the vehicle structure 400 utilizing an adhesive. As such, it is appreciated that the bottom surface 404 of the vehicle structure 400 may need to be prepared first before bonding the reinforcing core. Additionally, once a portion of the reinforcing core is fitted into center portion 638 or gores 622, 626, 630, and 634, the combined structure may be vacuum bagged and cured in a curing device so as to cure the adhesive attaching the portion of the reinforcing core to the bottom surface 404 of the vehicle structure 400.

Figure 12:
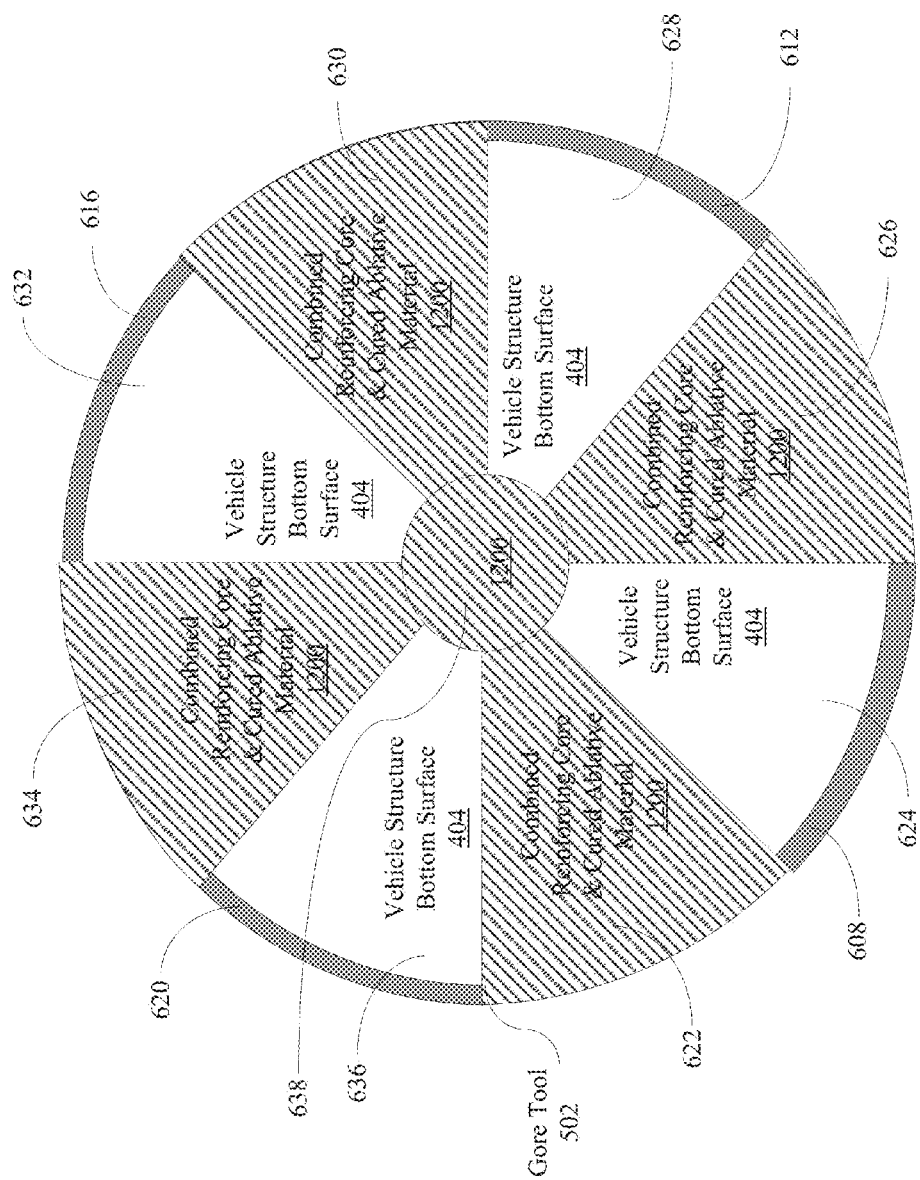
FIG. 12 is a top view of the bottom surface of the vehicle structure of FIGS. 6 and 11 showing a combined reinforcing core and cured ablative material on the bottom surface of the vehicle structure without the gore and cap tools in accordance with the present invention.
Figure 13:
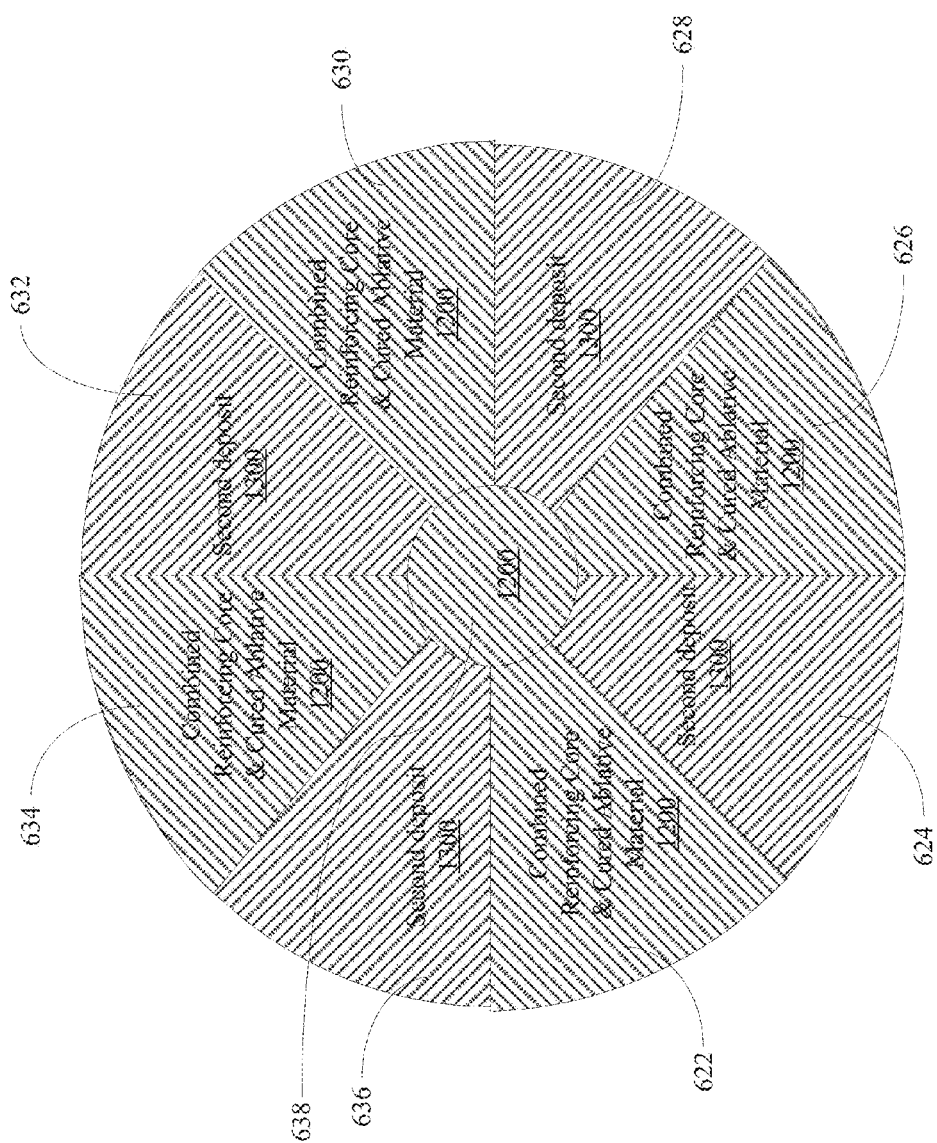
FIG. 13 is a top view of the bottom surface of the vehicle structure of FIGS. 6, 11, and 12 showing the first deposit of the combined reinforcing core and cured ablative material, shown in FIG. 12, with the new second deposit of combined reinforcing core and ablative material in accordance with the present invention.

In FIG. 12, the process may then be repeated, and the gores 624, 628, 632, and 636 (also known as "close-outs," which are adjacent to gores 622, 626, 630, and 634, respectively) showing the exposed portions of the bottom surface 404 of the vehicle structure 402 are filled first with another portion of the reinforcing core. The portions of the reinforcing core are attached to the bottom surface 404 of the vehicle structure 402 via bonding such as, for example, with an adhesive. Since, the combined reinforcing core and cured ablative material 1200 is bonded on to the bottom surface 404 of the vehicle structure 402 forming a hard barrier at gores 622, 626, 630, and 634, there is no need for use of the gore tooling 502, 504, 506, 508, 510, 600, 602, and 604 and cap tool 500 to hold the combined portions of the reinforcing core and applied ablative material; however, they optionally may still be utilized if a filled gap process is used. Additionally, by removing the gore tooling 502, 504, 506, 508, 510, 600, 602, and 604 and cap tool 500, the second deposit of ablative material applied in gores 624, 628, 632, and 636 will attach to the combined reinforcing core and cured ablative material 1200 and form a smooth layer of the combined reinforcing core and cured ablative material along the entire bottom surface 404 of the vehicle structure 402. In FIG. 13, a top view of the first deposit of the combined reinforcing core and cured ablative material 1200 is shown with the new second deposit of combined reinforcing core and ablative material 1300.

Again, it is noted that the portions of the reinforcing core bonded within gores 624, 628, 632, and 636 may be prepared first before bonding the portions of the reinforcing core. Additionally, once portions of the reinforcing core are fitted into gores 624, 628, 632, and 636, the combined structure may be vacuum bagged and cured in a curing device so as to cure the adhesive attaching the portion of the reinforcing core to the bottom surface 404 of the vehicle structure 400.

Figure 14:
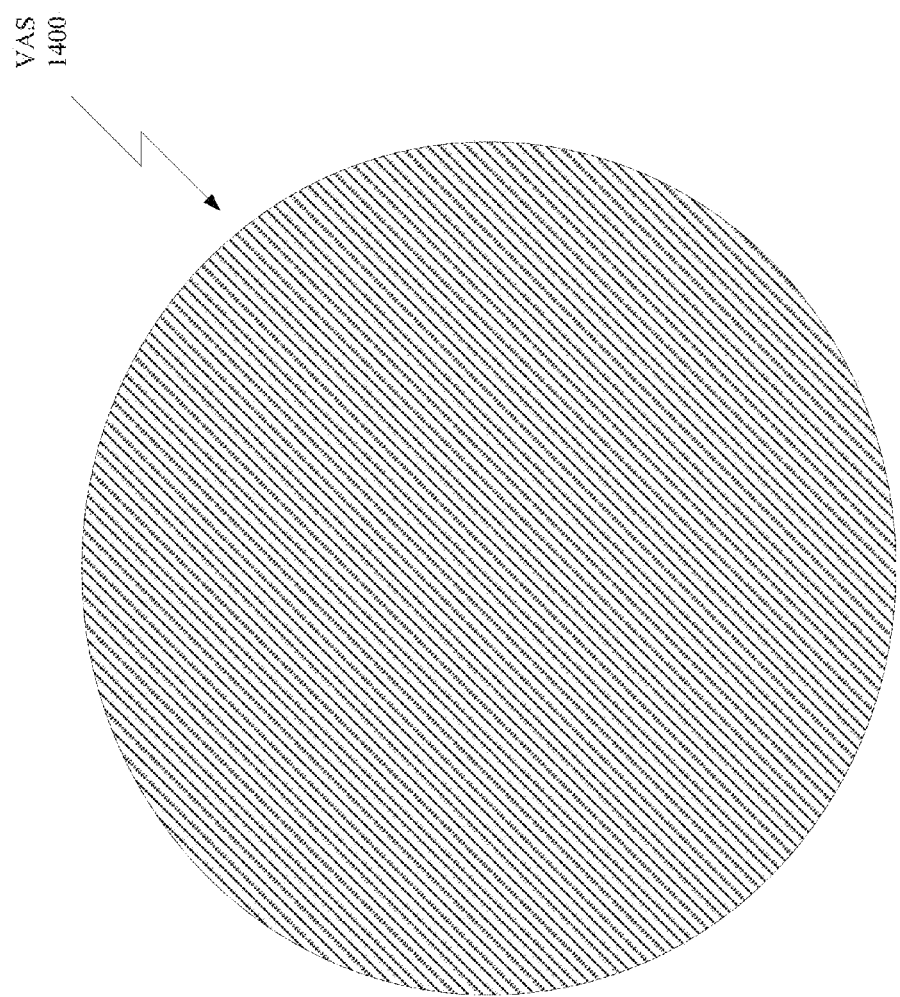
FIG. 14 is a top view of the VAS in accordance with the present invention.

Once the ablative material is packed into gores 624, 628, 630, and 632, the entire structure is again vacuum bagged for curing. The ablative material in the second deposit of combined reinforcing core and ablative material 1300 is then cured with a curing device. Once cured, the close-out tools 608, 612, 616, and 620 may be removed and the combined reinforcing core and cured ablative material 1200 and second deposit of combined reinforcing core and ablative material 1300 combine to form the VAS 1400 shown in FIG. 14. It is appreciated that this process may include a post-cure step.

In this example, only two attaching, packing, and curing cycles have been described for the purpose of illustration. However, it is appreciated that based on the size of the bottom surface 404 of the vehicle structure 402, this process may be divided up into more cycles of attaching, packing, and curing. Additionally, as mention earlier, the gores may be optionally divided into sub-divided gores and caps with tooling that defines different zones having gaps. Again, this approach allows for controlled local shrinkage of the ablator material after curing at elevated temperatures without cracks. The gaps may then be filled with a room-temperature curing formulation of the same ablator material.

Figure 15C:
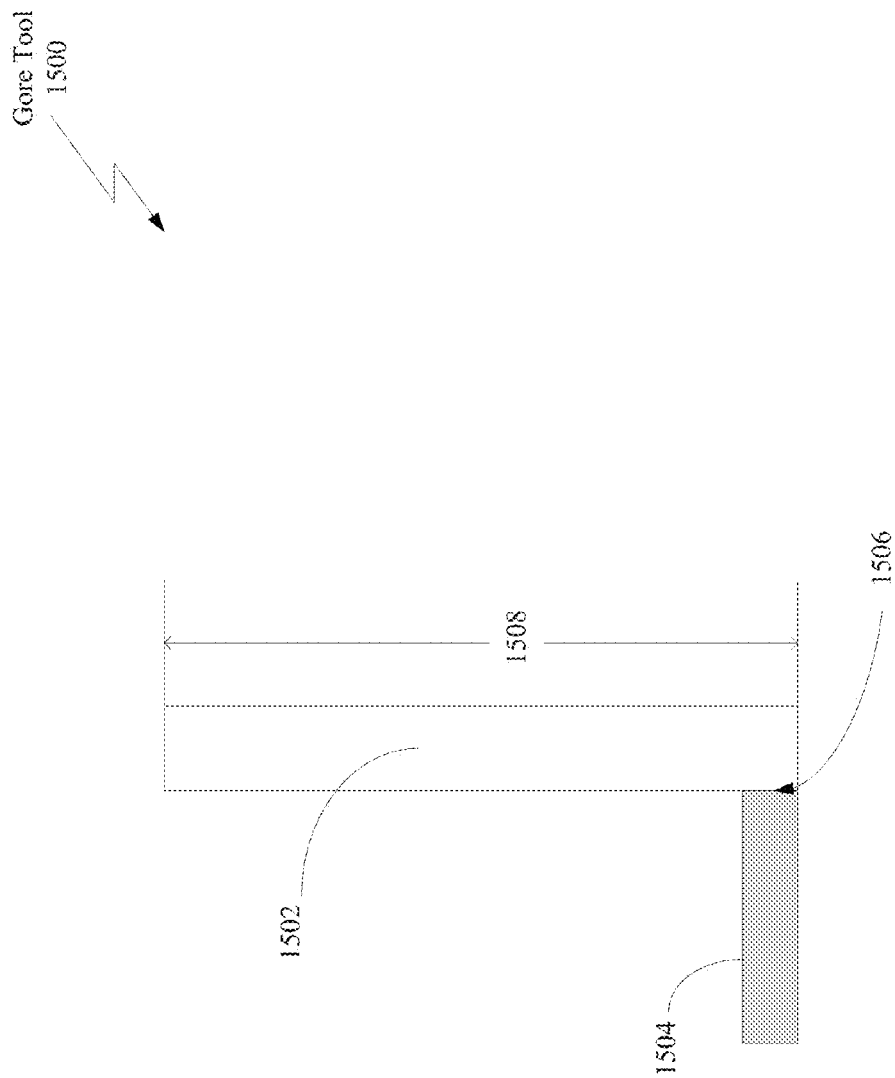

In FIGS. 5, 6, 7, 9, 11, and 12 the gore tooling has been illustrated generically; however, it is appreciated by those skilled in the art that the physical configuration of the gore tooling needs to be configured in a way that allows the gore tooling to stay in place along the bottom surface of the vehicle structure 404 when the entire structure is vacuum bagged for curing since the vacuum process will cause the gore tooling to experience forces that will attempt to move the individual gore tools. In FIGS. 15A through 15C, an example configuration of a gore tool 1500 is shown. Specifically, in FIG. 15A, a side view of an example of an implementation of the gore tool 1500 is shown in accordance with the present invention. The gore tool 1500 may include a vertical member 1502 and a horizontal member 1504 that are attached at the base 1506 of the gore tool 1500. The gore tool 1500 may have a gore tool height 1508 that extends from the bottom surface of the vehicle structure. FIG. 15B is top view of the gore tool 1500 shown in FIG. 15A. FIG. 15C is a partial side view of the gore tool 1500 along a cutting plane D-D' 1508 looking into the front 1508.

Similar to the gore tool 1500, the cap tool needs to be configured in a way that allows the cap tool to stay in place along the bottom surface of the vehicle structure 404 when the entire structure is vacuum bagged for curing. In FIGS. 16A and 16B, an example configuration of a cap tool 1600 is shown. Similar to the gore tool 1500, the cap tool 1600 may include a vertical member 1602 (i.e., a cylinder) and a horizontal member 1604 (i.e., a flat ring) that are attached at the base 1606 of the cap tool 1600. Moreover, the cap tool 1600 may have a cap tool height 1608 that extends from the bottom surface of the vehicle structure.

Figure 17:
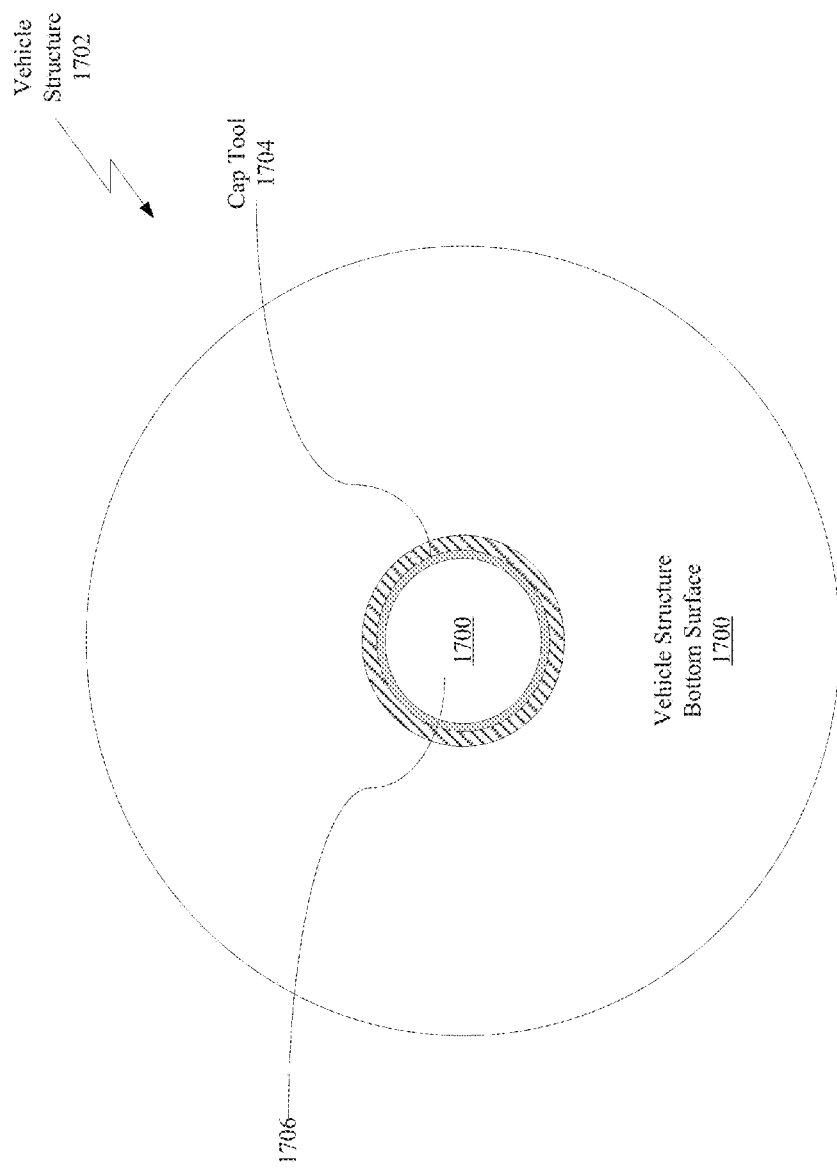
FIG. 17 is a top view of the bottom surface of the vehicle structure having a cap tool for an example of another implementation of the VAS in accordance with the present invention.

Turning to FIG. 17, an example of another implementation of the VAS is shown in accordance with the present invention. Specifically, in FIG. 17 a top view of the bottom surface 1700 of the vehicle structure 1702 (similar to vehicle structure 400 of FIG. 5) is shown with a cap tool 1704. In this example, the cap tool 1704 is place in center of the bottom surface 1700 of the vehicle structure 1702 defining a center portion 1706 of the bottom surface 1700 within the circular area of the cap tool 1704. The cap tool 1704 is part of the VAS tooling and, in this example, the cap tool 1704 is the same as the cap tool 1600 described in FIGS. 16A and 16B including having the same cap height 1608.

As described previously, the center portion 1706 will be filled with portions of a reinforcing core and ablative material through a stack-up and curing process. First a portion of the reinforcing core may be fitted and placed within the center portion 1706 and attached to the bottom surface 1700 of the vehicle structure 1702 via a bonding method such as, for example, use of adhesive. In this example, the reinforcing core may be made of the same materials described earlier.

The portion of the reinforcing core may be primed with an adhesion promoter or other similar sub-processes to help properly attach the reinforcing core to the bottom surface 1700 of the vehicle structure 1702. Once bonded, the portion of the reinforcing core may be submitted to a bonding verification process to test the quality of the bonding. Again, an example bonding verification process may include a local pull test of the portion of the reinforcing core bond, and/or visual inspection of adhesive wetting the core, and/or light leakage from one cell to another.

Figure 18:
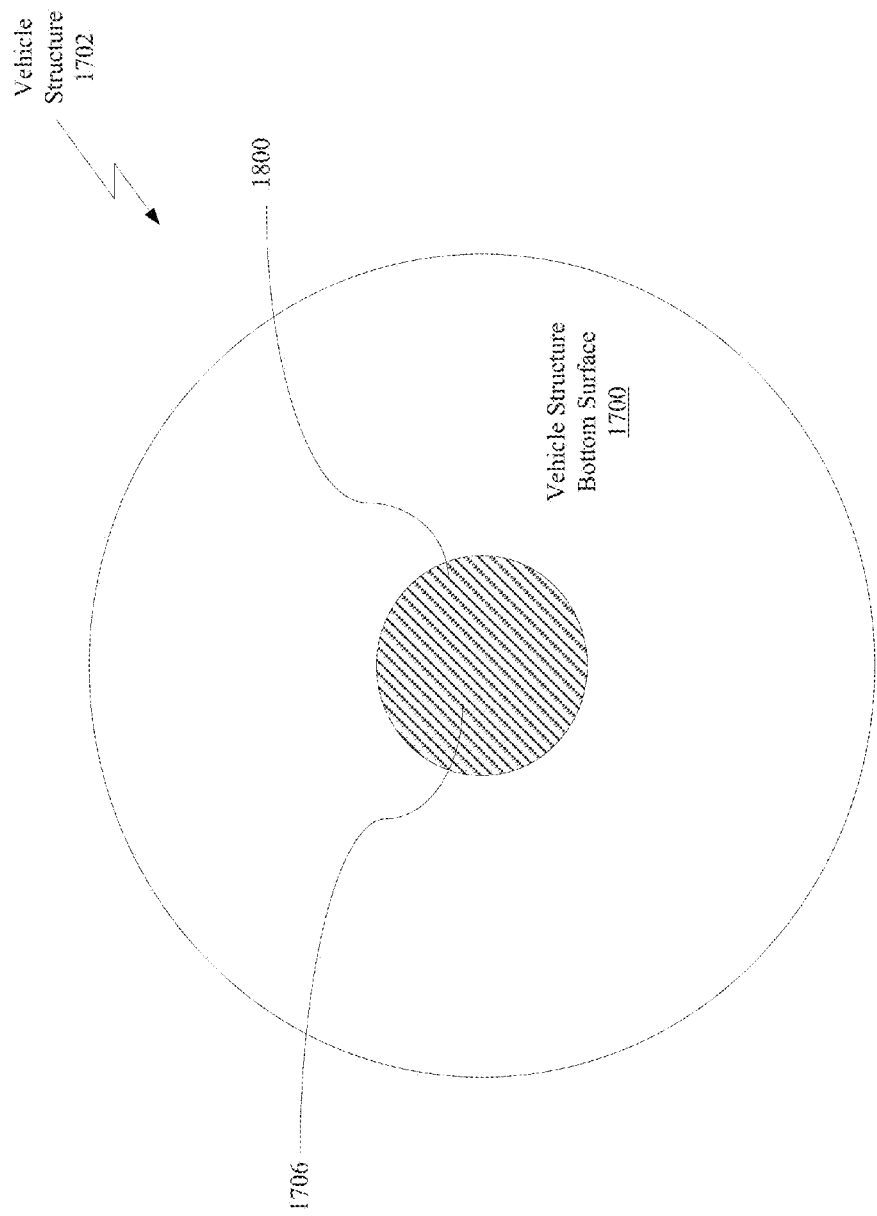
FIG. 18 is a top view of the bottom surface of the vehicle structure having a cured portion of a combined reinforcing core and cured ablative material formed by the cap tool shown in FIG. 17 in accordance with the present invention.

In this example, the height of the portion of the reinforcing core will be below the height of the cap tool 1608. A deposit of ablative material (not shown) is then packed into the center portion 1706 of the cap tool 1704. The ablative material is both packed into the cells of the reinforcing core and applied over the ablative filled reinforcing core to form a layer of ablative material over the portion of the reinforcing core but below the height 1608 of the cap tool 1704. Once the ablative material is packed into the center portion 1706, the entire structure is vacuum bagged for curing. The ablative material is then cured with a curing device such as, for example, an autoclave (not shown). Once cured, the cap tool 1704 is removed leaving only the cured portion of the combined reinforcing core and cured ablative material 1800, as shown in FIG. 18. When the cured portion of the combined reinforcing core and cured ablative material 1800, in the center portion 1706, is formed, gore tools (not shown) and close-out tools (not shown) may be added to the bottom surface 1700 of the vehicle structure 1702 to form gores that will be filled with portions of the reinforcing core and ablative material similar to the process described in FIGS. 5, 6, 7, 9, 11, 12, and 13.

Figure 19:
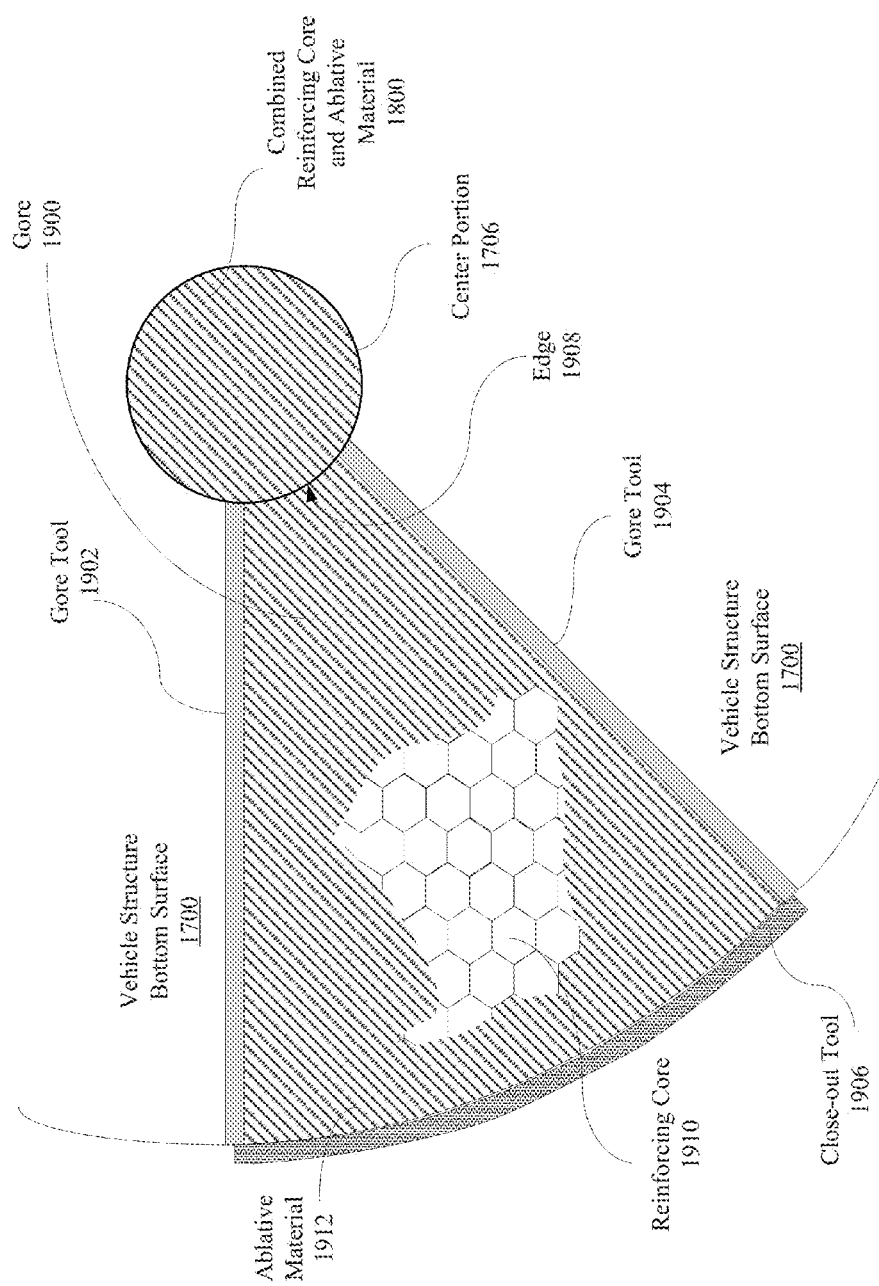
FIG. 19 is a top view of the bottom surface of the vehicle structure having an example of a gore in accordance with the present invention.

In FIG. 19, an example of a gore 1900 is shown. The gore 1900 includes gore tools 1902 and 1904 and a close-out tool 1906. In this example, a perimeter of the gore 1900 may be defined by both gore tools 1902 and 1904, the close-out tool 1906, and an edge of the center portion 1706 of the combined reinforcing core and ablative material 1800. In this example, the edge 1908 of the cured (i.e., hardened) combined reinforcing core and ablative material 1800 acts barrier capable of containing the portion of the reinforcing core 1910 and ablative material 1912 that will be placed in the gore 1900. Optionally, an additional dividing tool (not shown) may be placed between the two gore tools 1902 and 1904. The additional dividing tool may be a circumferential component structure that creates a strain relief joint for shrinkage during cure. With the use of the dividing tool, the gore tools 1902 and 1904, and close-out tool 1906, a structural frame-like perimeter may be created around the gore 1900.

Figure 20:
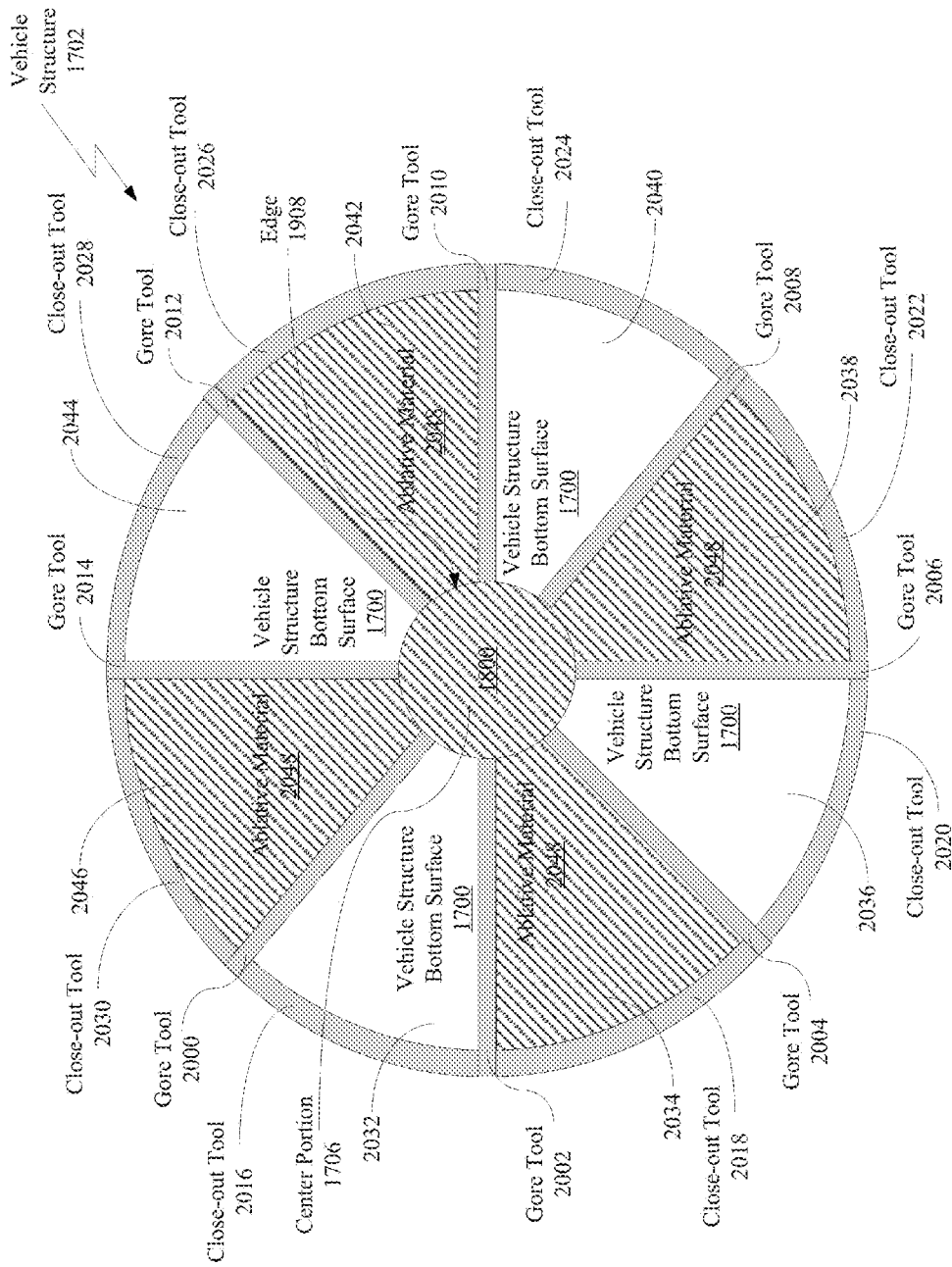
FIG. 20 is a top view of the bottom surface of the vehicle structure of FIGS. 17 and 18 showing four of the gores and the center portion being filled with a combination of portions of the reinforcing core and a first and second deposit of ablative material in accordance with the present invention.

Turning to FIG. 20, gore tools 2000, 2002, 2004, 2006, 2008, 2010, 2012, and 2014 and close-out tools 2016, 2018, 2020, 2022, 2024, 2026, 2028, and 2030 are added to the bottom surface 1700 of the vehicle structure 1702 to create gores 2032, 2034, 2036, 2038, 2040, 2042, 2044, and 2046, respectively. In this example, the gores 2034, 2038, 2042, and 2046 may be filled with portions of the reinforcing core and then filled with a second deposit of the ablative material 2048, where the gores 2032, 2036, 2040, and 2044 remain as exposed portions of the bottom surface 1700 of the vehicle structure 1702. In this example, the portions of the reinforcing core lie beneath the second deposit of the ablative material 2048 where the ablative material 2048 is both packed into the cells of the reinforcing core and applied over the ablative filled reinforcing core to produce a layer of ablative material 2048 over the ablative filled reinforcing core. Once the ablative material 2048 is packed into gores 2034, 2038, 2042, and 2046, the entire structure is vacuum bagged for curing. The ablative material 2048 is then cured with a curing device such as, for example, an autoclave (not shown). Once cured, the gore tools 2000, 2002, 2004, 2006, 2008, 2010, 2012, and 2014 and the close-out tools 2018, 2022, 2026, and 2030 may be removed leaving only the close-out tools 2016, 2020, 2024, and 2028 and the cured portion of the combined reinforcing core and cured ablative material 2100 in gores 2034, 2038, 2042, and 2046, as shown in FIG. 21.

It is again noted that the portions of the reinforcing core may be bonded to the bottom surface 1700 of the vehicle structure 1702 utilizing an adhesive. As such, it is appreciated that the bottom surface 1700 of the vehicle structure 1702 may need to be prepared first before bonding the reinforcing core. Additionally, once a portion of the reinforcing core is fitted into center portion 1706 or gores 2034, 2038, 2042, and 2046, the combined structure may be vacuum bagged and cured in a curing device so as to cure the adhesive attaching the portion of the reinforcing core to the bottom surface 1700 of the vehicle structure 1702.

Figure 21:
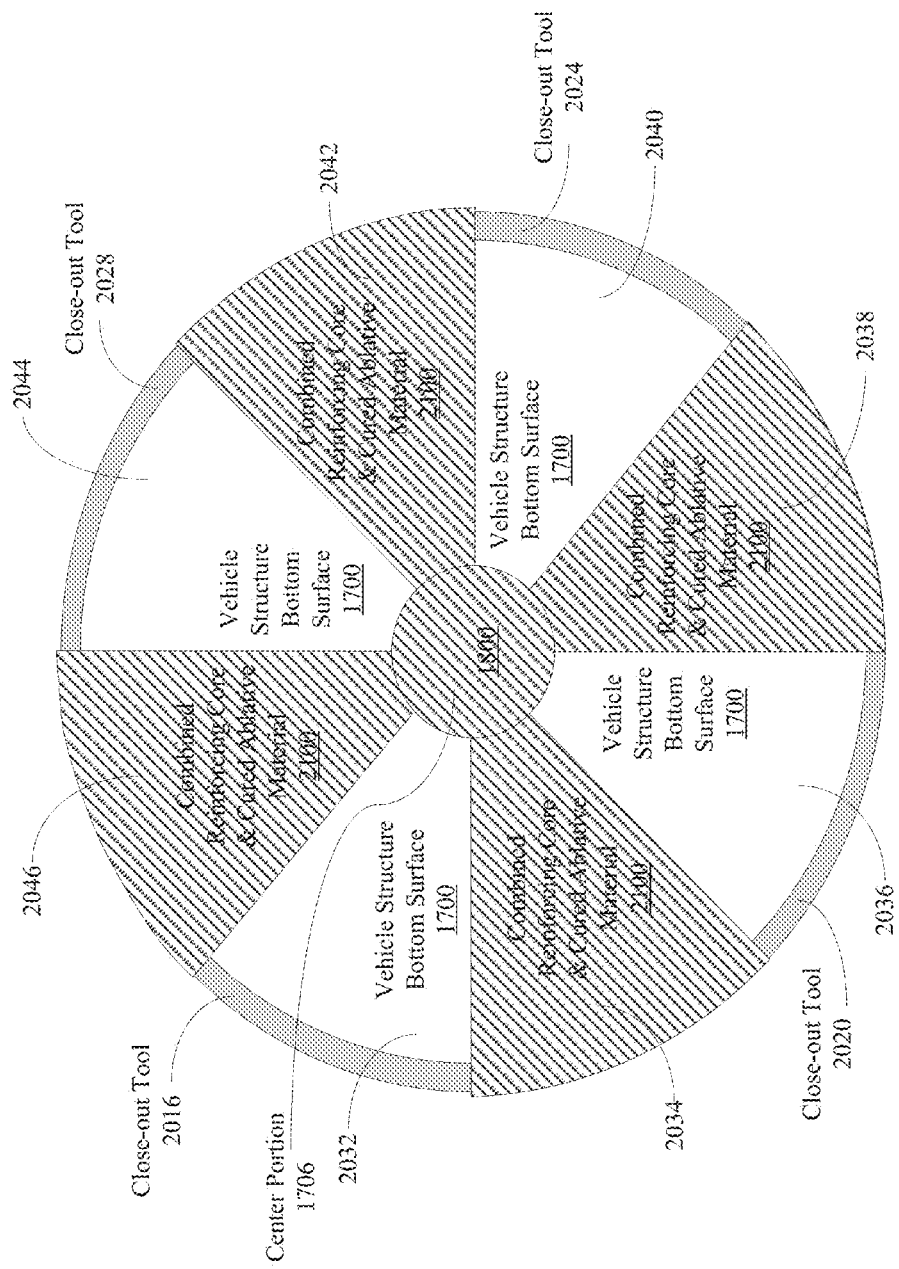
FIG. 21 is a top view of the bottom surface of the vehicle structure of FIGS. 17, 18, and 20 showing a combined reinforcing core and cured ablative material on the bottom surface of the vehicle structure without the gore and cap tools in accordance with the present invention.
Figure 22:
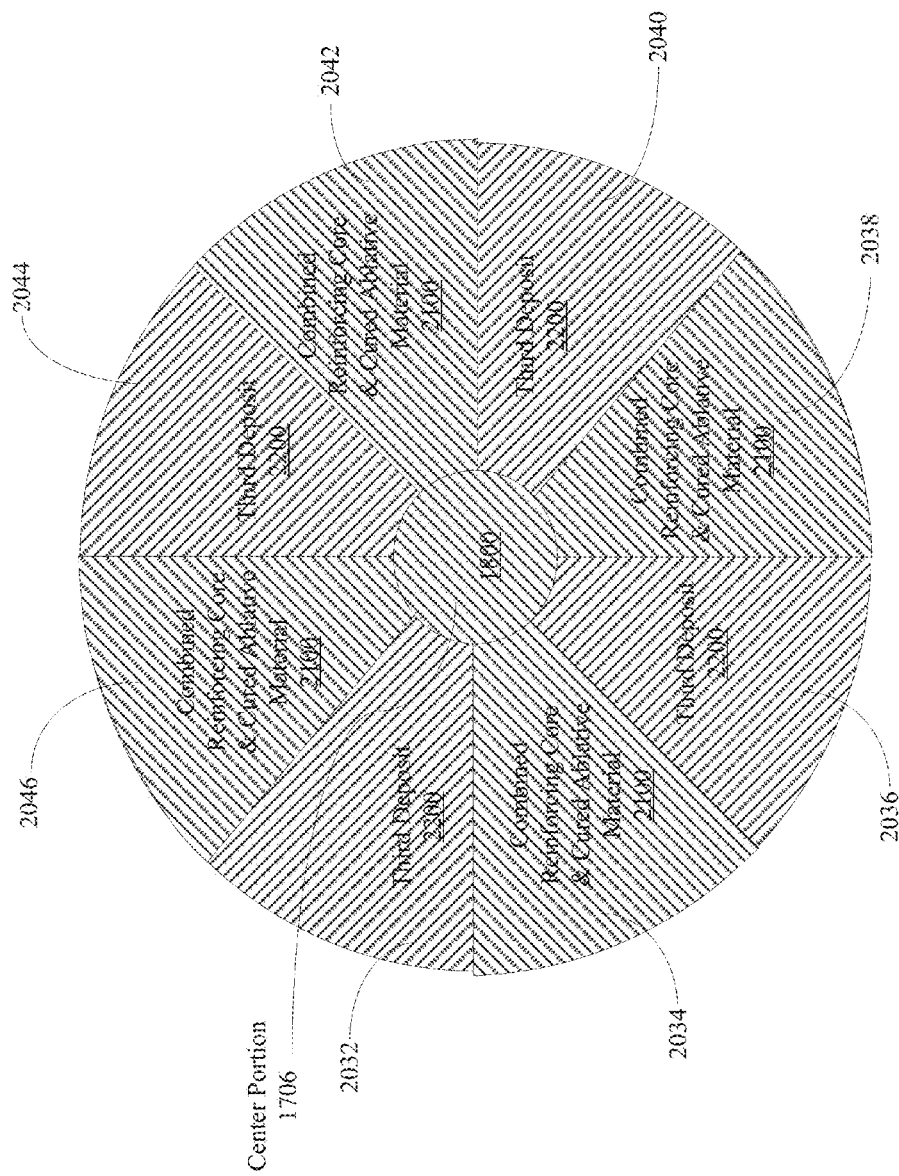
FIG. 22 is a top view of the bottom surface of the vehicle structure of FIGS. 17, 18, 20, and 21 showing the first and second deposits of the combined reinforcing core and cured ablative material, shown in FIG. 21, with the new third deposit of combined reinforcing core and ablative material in accordance with the present invention.

In FIG. 21, the process may then be repeated, and the gores 2032, 2036, 2040, and 2044 showing the exposed portions of the bottom surface 1700 of the vehicle structure 1702 are filled first with another portion of the reinforcing core. The portions of the reinforcing core are attached to the bottom surface 1700 of the vehicle structure 1702 via bonding such as, for example, with an adhesive. Since, the combined reinforcing core and cured ablative material 2100 is bonded on to the bottom surface 1700 of the vehicle structure 1702 forming a hard barrier at gores 2034, 2038, 2042, and 2046, there is no need for use of the gore tools 2000, 2002, 2004, 2006, 2008, 2010, 2012, and 2014 to hold the combined portions of the reinforcing core and applied ablative material. Additionally, by removing the gore tools 2000, 2002, 2004, 2006, 2008, 2010, 2012, and 2014, the third deposit of ablative material applied in gores 2032, 2036, 2040, and 2044 will attach to the combined reinforcing core and cured ablative material 2100 and form a smooth layer of the combined reinforcing core and cured ablative material along the entire bottom surface 1700 of the vehicle structure 1702. In FIG. 22, a top view of the first deposit of the combined reinforcing core and cured ablative material 1800, in the center portion 1706, and the second deposit of the combined reinforcing core and cured ablative material 2100 is shown with the new third deposit of combined reinforcing core and ablative material 2200.

Figure 23:
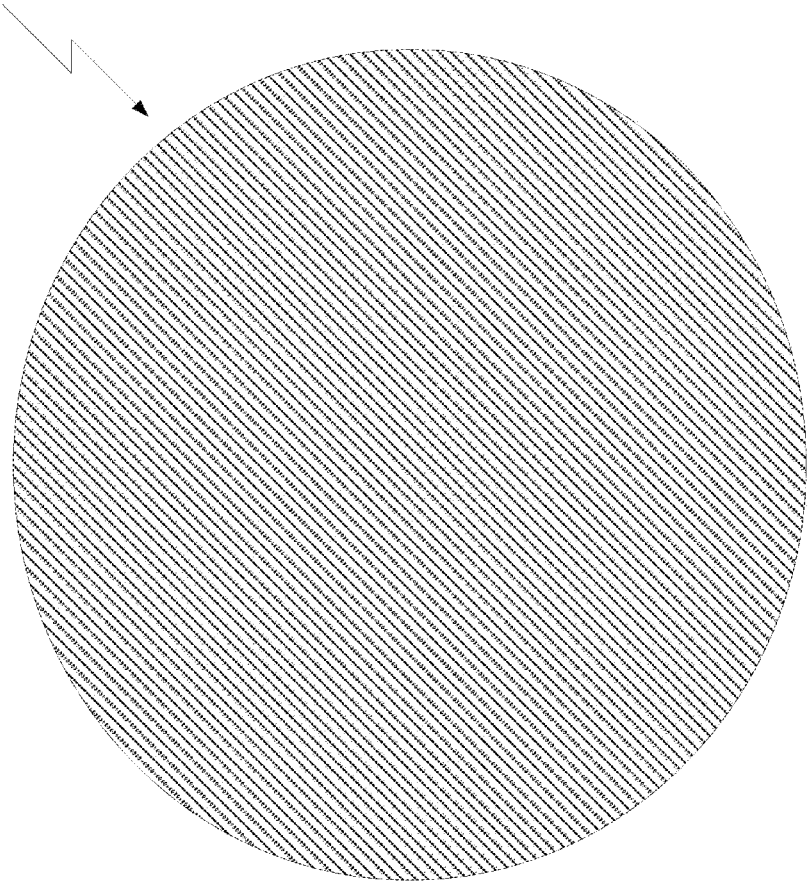
FIG. 23 is a top view of the VAS created from deposits shown in FIGS. 17, 18, 20, 21, and 22, in accordance with the present invention.

Once the ablative material is packed into gores 2032, 2036, 2040, and 2044, the entire structure is again vacuum bagged for curing. The ablative material in the third deposit of combined reinforcing core and ablative material 2200 is then cured with a curing device. Once cured, the close-out tools 2016, 2020, 2024, and 2028 may be removed and the combined reinforcing core and cured ablative material 1800, the second deposit of the combined reinforcing core and cured ablative material 2100 and third deposit of the combined reinforcing core and ablative material 2200 combine to form the VAS 2300 shown in FIG. 23. It is again appreciated that this process may include a post-cure step.

Figure 24:
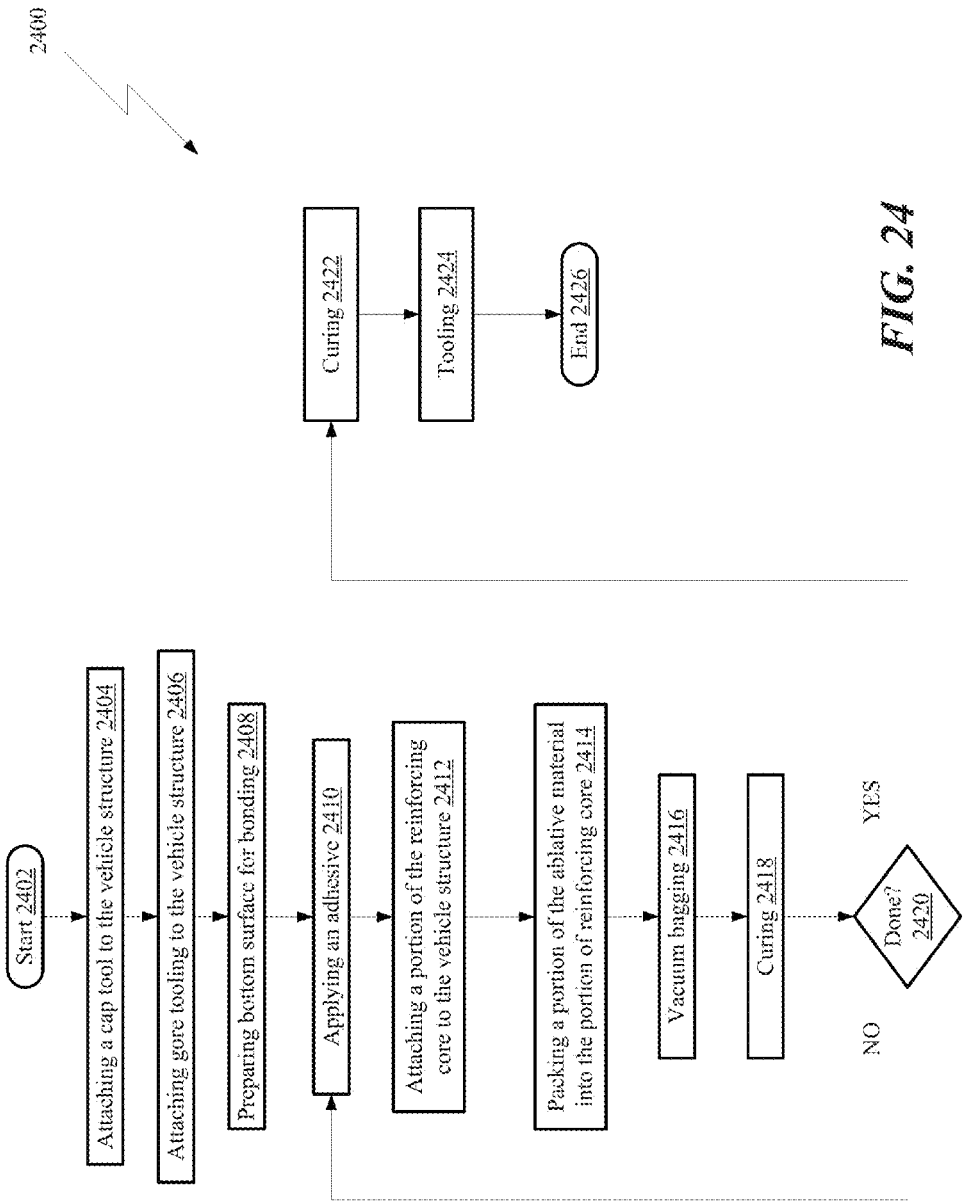
FIG. 24 is a flowchart illustrating the process of fabricating the VAS in accordance with the present invention.

In FIG. 24, a flowchart 2400 of an example of an implementation of a process of fabricating the VAS in accordance with the present invention is shown. The process starts 2402 by attaching a cap tool to a center portion of the bottom surface of vehicle structure, in step 2404, and then attaching gore tooling to the bottom surface of the vehicle structure in step 2406. The bottom surface of the vehicle structure is then prepared for attaching a first portion of a reinforcing core, in step 2408. In this example, preparing the bottom surface of the vehicle structure may include cleaning, abrading, and applying a primer. Once the bottom surface of the vehicle structure is prepared for bonding, an adhesive is applied, in step 2410, and the reinforcing core is placed into a first space (defined by the gore tooling or cap tool) and attached to the bottom surface of the vehicle structure in step 2412. The gore tooling defines a plurality of gores and the cap tool defines a center portion into which portions of the reinforcing core may be secured (i.e., attached). As an example, the first space may be center portion defined by the cap tool.

It is appreciated that the attaching a portion of reinforcing core step 2412 may include a plurality of sub-steps that include vacuum bagging the combined structure and curing the adhesive in a curing device. The ablative material is then packed into the first space to fill in the cavities within the reinforcing core and form a first deposit of the ablative material that covers the reinforcing core in step 2414. The combined structure is then vacuum bagged, in step 2416, and cured in step 2418. In decision step 2420, if additional spaces defined by the gore tooling and/or cap tool and the bottom surface of the vehicle structure are to be packed, the process repeats by returning to step 2410 and the process steps 2410 through 2418 repeats.

As an example, if the first space is the center portion, a second space may be half the adjacent gores defined by the gore tools, and a third space may be the remaining half of the adjacent gores defined by the gore tools. In this instance, the process steps 2410 through 2418 would repeat twice. It is appreciated that the process may include another step (not shown) of removing the cap tool after curing the first space and a further step (not shown) of removing the gore tools after curing the second space.

If, instead, there are no additional spaces to be packed, the process continues from decision step 2420 to optional curing step 2422. In step 2422, the vehicle structure may be vacuum bagged, prepared for curing, and cured. This additional curing step 2422 may be for curing additional ablator material that was packed into optional divider zones as discussed earlier and/or for a post-cure after installing the ablator material to the different gores. The process continues to step 2424 and the VAS is machined with different types of tooling (such as, for example, cutting and sanding tools) to finalize the VAS. The process then ends 2426.

It will be understood that various aspects or details of the invention may be changed without departing from the scope of the invention. The above description is not exhaustive and does not limit the claimed inventions to the precise form disclosed. Furthermore, the above description is for the purpose of illustration only, and not for the purpose of limitation. Modifications and variations are possible in light of the above description or may be acquired from practicing the invention. The claims and their equivalents define the scope of the invention.

What is claimed is:

1. A method for forming a vehicle ablator system ("VAS") having a reinforcing core on a vehicle structure, the method comprising:
forming a plurality of sector sections on a surface of the vehicle structure using a plurality of tools;
filling at least one of the plurality of sector sections with a portion of the reinforcing core and securing the portion of the reinforcing core to the surface of the vehicle structure;
packing the portion of the reinforcing core with an ablative material after securing the portion of the reinforcing core to the vehicle structure;
curing the ablative material in the portion of the reinforcing core; and
repeating the steps of filling at least one of the plurality of sector sections with a portion of the reinforcing core, securing the portion of the reinforcing core to the surface of the vehicle structure, packing the portion of the reinforcing core with the ablative material, and curing the ablative material.

2. The method of claim 1 where:
the reinforcing core includes a plurality of cavities; and
the step of packing the portion of reinforcing core includes packing ablative material into the plurality of cavities.

3. The method of claim 1, wherein the reinforcing core includes a honeycomb structure.

4. The method of claim 1, wherein securing the reinforcing core includes priming the reinforcing core with an adhesion promoter.

5. The method of claim 1, wherein curing the ablative material includes vacuum bagging the ablative material for cure and curing the ablative material in an autoclave.

6. The method of claim 1, further including removing the tooling after curing the ablative material.

7. The method of claim 1, further including:
performing bond verification of the portion of the reinforcing core to the vehicle structure.

8. The method of claim 7, wherein the step of performing bond verification includes performing a pull test on the reinforcing core.

9. The method of claim 1, wherein securing the portions of the reinforcing core to the vehicle structure includes bonding the reinforcing core to the vehicle structure.

10. The method of claim 9, wherein bonding the reinforcing core to the vehicle structure includes applying an adhesive.

11. A method for forming a vehicle ablator system ("VAS") having a reinforcing core on a vehicle structure, the method comprising:
forming a center portion surrounding a center of a surface of the vehicle structure using a cap tool and forming a plurality of gores on the surface of the vehicle structure surrounding the center portion using a plurality of gore tools, where the plurality of gores is bound along a periphery of the vehicle structure by a close-out tool;
filling the center portion and alternating gores surrounding the center portion with portions of the reinforcing core and securing the portion of the reinforcing core to the surface of the vehicle structure;
packing the portions of the reinforcing core with an ablative material after securing the portions of the reinforcing core to the vehicle structure;
curing the ablative material in the portions of the reinforcing core;
filling a remaining plurality of gores with corresponding portions of the reinforcing core and securing the corresponding portions of the reinforcing core to the surface of the vehicle structure;
packing the corresponding portions of the reinforcing core with the ablative material; and
curing the ablative material.

12. The method of claim 11 further comprising:
removing the gore tools and the cap tool after curing the ablative material in the center portion and the alternating gores.

13. The method of claim 11 further comprising:
performing a bond verification test on the portions of reinforcing core after filling and securing the portions of the reinforcing core in the center portion and the alternating gores; and
performing a bond verification test on the portions of reinforcing core after filing and securing the portions of the reinforcing core in the remaining plurality of gores.

14. A method for forming a vehicle ablator system ("VAS") having a reinforcing core on a vehicle structure, the method comprising:

forming a center portion surrounding a center of a surface of the vehicle structure using a cap tool and forming a plurality of gores on the surface of the vehicle structure surrounding the center portion using a plurality of gore tools, where the plurality of gores is bound along a periphery of the vehicle structure by a close-out tool;

filling the center portion with a portion of the reinforcing core and securing the portion of the reinforcing core to the surface of the vehicle structure;

packing the portion of the reinforcing core with a first deposit of ablative material after securing the portion of the reinforcing core to the vehicle structure;

curing the first deposit of ablative material in the portion of the reinforcing core;

filling alternating gores surrounding the center portion with corresponding portions of the reinforcing core and securing the corresponding portions of the reinforcing core to the surface of the vehicle structure;

packing the corresponding portions of the reinforcing core with a second deposit of ablative material;

curing the second deposit of ablative material;

filling a remaining plurality of gores with corresponding portions of the reinforcing core and securing the corresponding portions of the reinforcing core to the surface of the vehicle structure;

packing the corresponding portions of the reinforcing core with a third deposit of ablative material; and curing the third deposit of ablative material.

15. The method of claim 14 further comprising:
removing the cap tool after curing the first deposit of ablative material.

16. The method of claim 14 further comprising:
removing the gore tools after curing the second deposit of ablative material.

17. The method of claim 14 further comprising:
performing a bond verification test on the portions of reinforcing core after filling and securing the portions of the reinforcing core in the center portion;

performing a bond verification test on the portions of reinforcing core after filling and securing the portions of the reinforcing core in the alternating gores; and performing a bond verification test on the portions of reinforcing core after filing and securing the portions of the reinforcing core in the remaining plurality of gores.

\* \* \* \* \*